US00RE49622E

(19) United States
(12) Reissued Patent
Nabetani et al.

(10) Patent Number: US RE49,622 E
(45) Date of Reissued Patent: Aug. 22, 2023

(54) WIRELESS COMMUNICATION DEVICE AND WIRELESS COMMUNICATION METHOD

(71) Applicant: INTERNATIONAL SEMICONDUCTOR GROUP, Seoul (KR)

(72) Inventors: Toshihisa Nabetani, Kawasaki (JP); Tsuguhide Aoki, Kawasaki (JP); Hiroki Mori, Kawasaki (JP)

(73) Assignee: INTERNATIONAL SEMICONDUCTOR GROUP, Seoul (KR)

(21) Appl. No.: 17/006,357

(22) Filed: Aug. 28, 2020

Related U.S. Patent Documents

Reissue of:
(64) Patent No.: 10,063,342
Issued: Aug. 28, 2018
Appl. No.: 15/192,403
Filed: Jun. 24, 2016

U.S. Applications:
(63) Continuation of application No. PCT/JP2015/050420, filed on Jan. 5, 2015.

(30) Foreign Application Priority Data

Dec. 27, 2013 (JP) ..... 2013-273109

(51) Int. Cl.
*H04L 1/00* (2006.01)
*H04B 7/06* (2006.01)
(Continued)

(52) U.S. Cl.
CPC ..... *H04L 1/0026* (2013.01); *H04B 7/0452* (2013.01); *H04B 7/068* (2013.01);
(Continued)

(58) Field of Classification Search
CPC ..... H04L 1/0026; H04L 5/00; H04L 5/0094; H04B 7/0542; H04B 7/068; H04B 7/0697
See application file for complete search history.

(56) References Cited

U.S. PATENT DOCUMENTS 8,032,144 B2 10/2011 Nishio
8,170,571 B2 5/2012 Nishio
(Continued)

FOREIGN PATENT DOCUMENTS

JP 2005-27107 A 1/2005
JP 2007-208522 A 8/2007
(Continued)

OTHER PUBLICATIONS

Richard Van Nee, et al., "UL MU-MI MO for 11 ac," Qualcomm, doc. :IEEE 802.11-09/0852-00-00ac, Jul. 2009, 1 0 pages.
(Continued)

*Primary Examiner* — Robert L Nasser
(74) *Attorney, Agent, or Firm* — Oblon, McClelland, Maier & Neustadt, L.L.P.

(57) ABSTRACT

A wireless communication device includes a transmitter and a receiver. The transmitter transmits a first frame containing notification information to specify first and second wireless terminals and a second frame for channel estimation. The receiver receives a third frame transmitter from the first wireless terminal and a fourth frame transmitted from the second wireless terminal. The third frame and the fourth frame are transmitted in a multiplexing scheme by the first and the second wireless terminals. The third frame contains first channel information estimated based on the second frame. The fourth frame contains second channel information estimated based on the second frame. The first frame contains at least either information to specify a preamble of the third frame and a preamble of the fourth frame or
(Continued)

information to specify a subcarrier used for transmission of the third frame and a subcarrier used for transmission of the fourth frame.

20 Claims, 19 Drawing Sheets

(51) Int. Cl.
*H04B 7/0452* (2017.01)
*H04L 5/00* (2006.01)

(52) U.S. Cl.
CPC ..... *H04B 7/0697* (2013.01); *H04L 5/00* (2013.01); *H04L 5/0094* (2013.01)

(56) References Cited

U.S. PATENT DOCUMENTS

| | | | | |
|---|---|---|---|---|
| 8,243,690 | B2 | 8/2012 | Li et al. | |
| 8,369,861 | B2 | 2/2013 | Nishio | |
| 8,761,033 | B2 | 6/2014 | Abraham et al. | |
| 9,001,759 | B2 | 4/2015 | Li et al. | |
| 2006/0182017 | A1* | 8/2006 | Hansen | H04B 7/02 370/208 |
| 2010/0091915 | A1* | 4/2010 | Xu | H04B 7/0671 375/343 |
| 2010/0220679 | A1* | 9/2010 | Abraham | H04W 74/06 370/329 |
| 2011/0051647 | A1* | 3/2011 | Sampath | H04L 1/0003 370/312 |
| 2011/0176478 | A1 | 7/2011 | Inohiza | |
| 2011/0235533 | A1* | 9/2011 | Breit | H04B 7/0452 370/252 |
| 2011/0237205 | A1* | 9/2011 | Nieto | H04L 1/0003 455/73 |
| 2011/0269481 | A1* | 11/2011 | Halfmann | H04W 64/00 455/456.1 |
| 2012/0207071 | A1* | 8/2012 | Zhu | H04B 7/0452 370/311 |
| 2013/0259101 | A1* | 10/2013 | Earnshaw | H04B 3/32 375/219 |
| 2014/0269544 | A1* | 9/2014 | Zhu | H04L 1/1671 370/329 |
| 2015/0022338 | A1* | 1/2015 | Hwang | H04W 4/90 340/501 |
| 2015/0071051 | A1* | 3/2015 | Zhu | H04W 72/121 370/216 |
| 2015/0117329 | A1* | 4/2015 | Avudainayagam | H04B 3/54 370/329 |

FOREIGN PATENT DOCUMENTS

| | | | |
|---|---|---|---|
| JP | 2007-215007 | A | 8/2007 |
| JP | 2010-93758 | A | 4/2010 |
| JP | 2012-532496 | A | 12/2012 |
| JP | 2013-13132 | A | 1/2013 |
| WO | WO 2013/169389 | A1 | 11/2013 |

OTHER PUBLICATIONS

Sigurd Schelstraete, et al., "Protocol and signaling framework for OFDMA," Quantenna, doc.: IEEE 802.11-14/1433r0, Nov. 2014, 12 pages.
"Draft Standard for Information Technology—Telecommunications and information exchange between systems—Local and metropolitan area networks Specific requirements" Part 11: Wireless LAN Medium Access Control (MAC) and Physical Layer (PHY) specifications Amendment 4: Enhancements for Very High Throughput for Operation in Bands below 6 GHz, Prepared by the 802.11 Working Group of the 802 Committee, IEEE P802.llac™ ID7.0, Sep. 2013, 456 Pages.
"IEEE Standard for Information technology—Telecommunications and information exchange between systems Local and metropolitan area networks—Specific requirements" Part 11: Wireless LAN Medium Access Control (MAC) and Physical Layer (PHY) Specifications Amendment 4: Enhancements for Very High Throughput for Operation in Bands below 6 GHz, IEEE Computer Society, IEEE Std 802.llac™-2013, Approved Dec. 11, 2013, 425 Pages.
Richard Van Nee, et al., "UL MU-MIMO for 11 ac," Qualcomm, doc.:IEEE 802.11-09/0852-00-00ac, Jul. 2009, 10 pages.
Robert Stacey, "11-15-0132-17-00ax-spec-framework" Specification Framework for TGax, May 25, 2016, pp. 1-61.
International Search Report dated Apr. 8, 2015 in PCT/JP2015/050420 (submitting English translation only).
Richard Van Nee, "Uplink MU-MIMO Sensitivity to Power Differences and Synchronization Errors," Qualcomm, doc.:IEEE 802.11-09/1036-00-00ac, Sep. 2009, 17 pages.
Jinyoung Chun, et al., "Uplink multi-user transmission," LG Electronics, doc.: IEEE 11-13/1388r0, Nov. 2013, 18 pages.
Tran Thi Thao Nguyen, et al., "Uplink multi-user MAC protocol for 11ax," Kyushu Institute of Technology, doc.: IEEE 11-14/0598r0, May 2014, 19 pages.
Jinyoung Chun, et al., "Consideration on UL MU transmission," LG Electronics, doc.: IEEE 11-14/0802r0, Jul. 2014, 10 pages.
Kaiying Lv, et al., "Frame Exchange Control for Uplink Multi-user transmission," doc.: IEEE 802.11-14/1190r2, Sep. 2014, 12 pages.
Yongho Seok, et al., "HEW PPDU Format for Supporting MIMO-OFDMA," NEWRACOM, doc.: IEEE 802.11-14/1210r1 , Sep. 2014, 16 pages.
Yongho Seok, et al., "Ack Procedure for OFDMA," NEWRACOM, doc.: IEEE 802.11-14/1211r0, Sep. 2014, 11 pages.
Young Hoon Kwon, et al., "Issues on UL-OFDMA Transmission," doc.: IEEE 802.11-14/1431r1, Sep. 2014, 19 pages.
Tomoya Tandai, et al., "An efficient uplink multiuser MIMO protocol in IEEE 802.11 WLANs," (2009), pp. 1153-1157.
G. Redieteab, et al., "PHY+MAC Channel Sounding Interval Analysis for IEE 802.11ac MU-MIMO," (2012), pp. 1054-1058.
Michelle X. Gong, et al., "Training Protocols for Multi-User MIMO Wireless LANs," IEEE 21st International Symposium on Personal Indoor and Mobile Radio Communications, (2010), pp. 1218-1223.
"IEEE Standard for Information technology—Telecommunications and information exchange between systems Local and metropolitan area networks—Specific requirements," Part 11: Wireless LAN Medium Access Control (MAC) and Physical Layer (PHY) Specifications, IEEE Computer Society, IEEE Standards Association, IEEE Std 802.11™-2012 (revision of IEEE Std 802.11-2007, Mar. 29, 2012, 2792 pages.

* cited by examiner

WIRELESS COMMUNICATION DEVICE AND WIRELESS COMMUNICATION METHOD

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

This application is a Continuation of International Application No. PCT/JP2015/050420, filed on Jan. 5, 2015, the entire contents of which is hereby incorporated by reference.

FIELD

Embodiments described herein relate to a communication controlling device, a wireless terminal, a memory card, an integrated circuit, and a wireless communication method.

BACKGROUND

As a wireless communication system in which a wireless access point and a wireless terminal communicate with each other, the wireless LAN (Local Area Network) based on the IEEE 802.11 standard that uses CSMA/CA (Carrier Sense Multiple Access/Collision Avoidance) is widely known. IEEE Std 802.11™-2012 and IEEE Std 802.11ac™-2013 are known as wireless LAN specification. In the IEEE 802.11n standard, MIMO (Multi-Input Multi-Output) technology is used, which achieves an increased speed of wireless communication.

In the MIMO technology, a transmission-side apparatus and a reception-side apparatus each include a plurality of antennas installed therein. The transmission-side apparatus simultaneously transmits a plurality of pieces of data with the plurality of antennas. The reception-side apparatus simultaneously receives the plurality of pieces of data with the plurality of antennas, and separates the plurality of received pieces of data from one another. This allows a plurality of data streams to be transmitted and received. The higher the number of data streams is, the higher throughput can be obtained as compared with conventional SISO (Single-Input Single-Output).

In addition, in an effort to increase the speed, the IEEE 802.11ac standard is now being formulated. The IEEE 802.11ac standard uses a downlink multiuser MIMO (DL-MU-MIMO) technology, which is an expansion of the MIMO technology. In the downlink multiuser MIMO, an access point simultaneously transmits different pieces of data to a plurality of wireless terminals from a plurality of antennas. This allows the access point to simultaneously communicate with the plurality of wireless terminals.

The downlink multiuser MIMO uses a technique called beamforming. In the beamforming, a beam that causes data streams addressed to the wireless terminals to least interfere with one another, that is, a beam that makes data streams addressed to the wireless terminals spatially orthogonal, are formed and transmitted for each wireless terminal. This makes spatial multiplexing available, which in turn allows the access point to simultaneously transmit different pieces of data to the plurality of wireless terminals.

To implement the downlink multiuser MIMO, the access point needs to obtain information on channels between the antennas thereof and the wireless terminals. That is, the access point needs to detect how the wireless terminals receive signals transmitted from the antennas thereof. Using information on the channels allows the access point to form an optimal beam that does not interfere with other wireless terminals. The IEEE 802.11ac standard defines such a protocol that allows for estimation of the channels between the access point and the wireless terminals.

According to the protocol defined in the IEEE 802.11ac standard, the access point causes the wireless terminals to estimate channel responses and to feed them back in turn, so as to detect a state of the channels with respect to the wireless terminals. As a result, the higher the number of the wireless terminals performing channel estimation, the longer it takes for the estimation to be performed. This increases an overhead time taken to start the downlink multiuser MIMO. In addition, this decreases a correlation between a state of the channels when the wireless terminals estimated them and a state of the channels when the downlink multiuser MIMO is actually started. Thus, in the downlink multiuser MIMO transmission using the channel information obtained from the wireless terminals, an adequate beam may not be formed due to temporal fluctuations of the channels. Also, an inadequately formed beam may disadvantageously interfere with other wireless terminals.

DETAILED DESCRIPTION

According to one embodiment, a wireless communication device includes a transmitter and a receiver. The transmitter is configured to transmit a first frame containing notification information to specify a first wireless terminal and a second wireless terminal and a second frame for channel estimation. The receiver is configured to receive a third frame transmitter from the first wireless terminal and a fourth frame transmitted from the second wireless terminal. The third frame and the fourth frame are transmitted in a multiplexing scheme by the first wireless terminal and the second wireless terminal. The third frame contains first channel information estimated based on the second frame. The fourth frame contains second channel information estimated based on the second frame. The first frame contains at least either information to specify a preamble of the third frame and a preamble of the fourth frame or information to specify a subcarrier used for transmission of the third frame and a subcarrier used for transmission of the fourth frame.

Hereinafter, embodiments of the present invention will be described with reference to the drawings. Assume that the entire contents of IEEE Std 802.11™-2012 and IEEE Std 802.11ac™-2013, known as the wireless LAN specification, are incorporated by reference in the present specification.

First Embodiment

Figure 1:
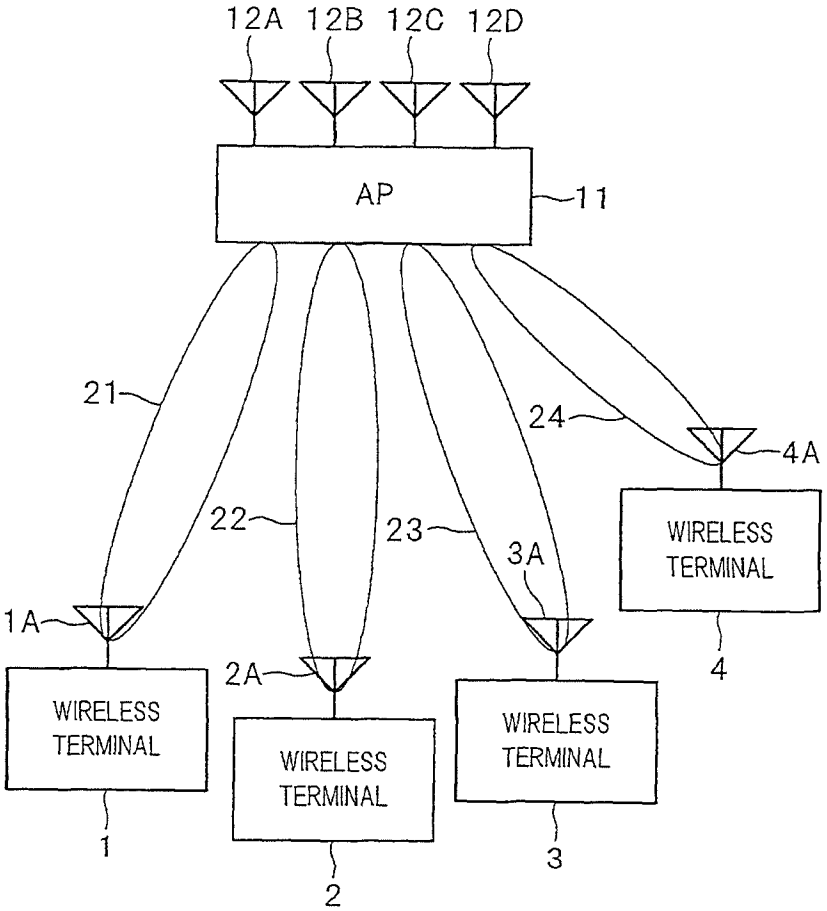
FIG. 1 is a diagram showing a wireless communication system according to a first embodiment.

FIG. 1 shows a wireless communication system according to a first embodiment.

The wireless communication system of FIG. 1 is a wireless network including an access point (AP) 11 and a plurality of wireless terminals (stations) 1, 2, 3, and 4. The access point 11 is one form of a wireless terminal. The access point 11 and the wireless terminals 1 to 4 perform wireless communication based on any wireless communication method. As one example, the access point 11 and the wireless terminals 1 to 4 perform the wireless communication based on the IEEE 802.11 standard. Although the following description will be mainly made assuming that a wireless LAN complies with the IEEE 802.11 standard, the present embodiment is not limited thereto.

The access point 11 includes a plurality of antennas. In the example of FIG. 1, the access point 11 includes four antennas 12A, 12B, 12C, and 12D. The access point 11 includes a wireless communication device (refer to FIG. 9 to be described hereafter) installed therein. The wireless communication device includes a wireless communication unit and a communication controlling device that controls communication with the wireless terminals 1 to 4 being a plurality of communication devices.

The wireless terminals 1 to 4 each include one or more antennas. In the example of FIG. 1, the wireless terminals 1 to 4 include one antenna 1A, 2A, 3A, and 4A, respectively. The wireless terminals each include a wireless communication device (refer to FIG. 10 to be described hereafter) installed therein. The wireless communication device includes a wireless communication unit and a communication controlling device that controls communication with the access point 11 being a communication device.

The access point 11 forms the wireless network (referred to as first network) that is formed with the wireless terminals, and may be connected to another wired or wireless network (referred to as second network) in addition to the first network. The access point 11 relays communication between the first network and the second network, or among the wireless terminals. The access point 11 receives frames addressed to the wireless terminals 1 to 4 from the second network or a wireless terminal in the first network, and holds the frames in an internal buffer thereof. The access point 11 transmits the held frames addressed to the wireless terminals 1 to 4 to the wireless terminals 1 to 4 by spatial multiplexing. The transmission by spatial multiplexing means that a plurality of data streams are transmitted at the same time in the same frequency band. Specifically, the access point 11 transmits the frames addressed to the wireless terminals in the downlink multiuser MIMO. The downlink multiuser MIMO transmission can increase the throughput. Note that the frames in the present embodiment may be, for example, those called packets, not only those called frames in the IEEE 802.11 standards.

To perform the downlink multiuser MIMO transmission, the access point 11 obtains in advance channel information that represents a state of the channels of downlinks from the antennas 12A to 12D to the wireless terminals 1 to 4, from the wireless terminals 1 to 4. One of features of the present embodiment is obtaining the channel information from these wireless terminals 1 to 4 in a short time. A method of channel estimation in the wireless terminal will be described hereafter in detail.

The access point 11 calculates a directional beam pattern on the basis of the pieces of channel information obtained from the wireless terminals, in such a manner as to suppress interference among signals addressed to the plurality of the wireless terminals 1 to 4. The access point 11 forms beams 21, 22, 23, and 24 in conformity with such a directional beam pattern. The data frames addressed to the wireless terminals are thereby transmitted. In such a manner, the access point 11 can transmit data frames to the wireless terminals at the same time in the same frequency band. That is, the downlink multiuser MIMO transmission is possible.

In the example of FIG. 1, although the number of the directional beams is four and the number of wireless terminals simultaneously communicating is also four, the present embodiment is not limited thereto. For example, the number of wireless terminals simultaneously communicating may be three while the number of the directional beams is four. In this case, one of the three wireless terminals may include a plurality of antennas, and the access point 11 may form two directional beams toward the wireless terminal in question. It is thereby possible to transmit two data streams to the one wireless terminal in question, and to transmit one data stream to each of the remaining two wireless terminals. Note that, in FIG. 1, a terminal other than wireless terminals 1 to 4 may establish a wireless link with the access point 11.

In the example of FIG. 1, the number of antennas included in the access point 11 is four, but the number of antennas may be any number higher than one. Note that a maximum of the number of data streams that the access point 11 can transmit is equivalent to the number of the included antennas. In the case where the wireless terminals each include one antenna, the number of data streams that each wireless terminal can transmit is one, and the number of antennas included in the access point 11 may be therefore equal to or higher than the number of wireless terminals with which the downlink multiuser MIMO transmission is performed.

Note that, in the example of FIG. 1, in the case where the downlink multiuser MIMO transmission is performed from the access point 11 to the wireless terminals, the access point 11 forms the beams, and the wireless terminals receive the beams formed. In terms of these roles, the access point 11 may be called a Beamformer, and the wireless terminals may be called Beamformees.

Figure 2:
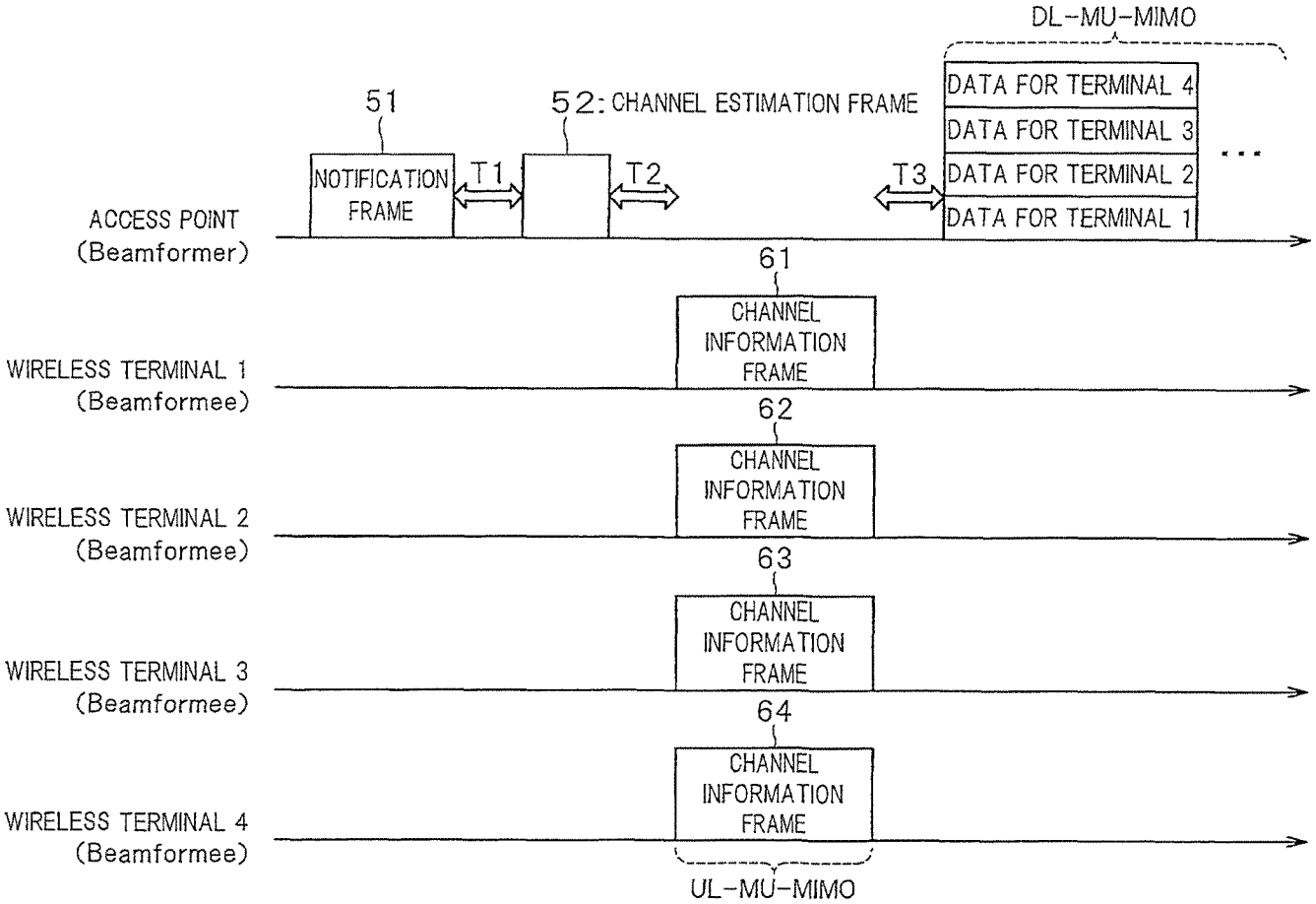
FIG. 2 is a diagram illustrating an outline of a manner an access point obtains pieces of channel information on downlinks from wireless terminals.

FIG. 2 is a diagram illustrating an outline of a manner the access point 11 obtains the pieces of channel information from the wireless terminals. Signals (frames) transmitted by the access point 11 and the wireless terminals are shown as rectangles. The horizontal axis is a time axis, and a right direction thereof along the drawing is a direction of time passage.

As a precondition, the access point 11 has established in advance a wireless link with a plurality of wireless terminals including the wireless terminals 1 to 4, and holds the frames addressed to the wireless terminals 1 to 4 in the internal buffer thereof. Let us assume a situation in which the access point 11 will now transmit the frames to the wireless terminals 1 to 4 in the downlink multiuser MIMO manner.

First, the access point 11 determines a plurality of wireless terminals that should perform channel estimation, and transmits, through any one of the antennas, a notification frame 51 containing notification information that specifies the plurality of wireless terminals in question. The notification frame 51 may contain, as will be described hereafter, additional information on a method of transmitting channel information frames from the wireless terminals 1 to 4. The plurality of wireless terminals that should perform channel estimation are, for example, wireless terminals to which frames to be transmitted exist in the buffer of the access point 11. Note that the access point 11 can transmit the notification frame 51 also from a plurality of antennas.

The notification frame 51 is transmitted, as one example, in a broadcasting manner. Note that the notification frame 51 may be transmitted in a manner other than broadcasting, such as multicasting or unicasting. The notification frame 51 is configured by, for example, a Control Frame defined in the IEEE 802.11 standards. As a specific example of the notification frame 51, an NDP (Null Data Packet) Announcement (NDPA) frame, which is defined in the IEEE 802.11 standard, may be used. Alternatively, the NDPA frame defines an expanded frame, and the frame defined thus may be used.

Note that, it is assumed that the access point 11 performs carrier sensing based on the CSMA/CA to obtain a right to transmission, before transmitting the notification frame 51. The right to transmission is obtained since a result of carrier sensing comes back as idle if a signal of a certain level or more is not received during carrier sensing. If a signal of a certain level or more is received during carrier sensing, the right to transmission is not obtained since the carrier sensing result comes back as busy. In this case, carrier sensing may be performed again after a backoff time.

Next, the access point 11 transmits a frame 52 for channel estimation after the lapse of a certain period of time T1 from transmitting the notification frame 51. The access point 11 transmits the channel estimation frames 52 at the same time with signals that are orthogonal to one another, from the antennas of the access point 11. By the simultaneous transmission of the frame signals orthogonal to one another from the antennas, the reception side can correctly separate the frames even when the signals from the antennas are received in a duplicate manner. A configuration of the channel estimation frames (bit streams) transmitted from the antennas is known to the wireless terminals. The configuration of the channel estimation frames may be notified in advance, when associating or with a pilot signal, to the wireless terminals with which the wireless links are established, or can be notified to the wireless terminals being targets of channel estimation, with the notification frame 51. The method of transmitting the signals orthogonal to one another from the antennas will be described in detail in the description of transmitting the channel information frames from the wireless terminals to the access point. Note that, as a modification of this operation, the access point 11 may consecutively transmit the channel estimation frames 52 using the antennas in turn, instead of transmitting the channel estimation frames at the same time through the antennas.

The channel estimation frame 52 may be in any format. The propagation channel estimation frame 52 may belong to neither the Control Frame nor a Management Frame, nor a Data Frame, which are defined in the IEEE 802.11 standards. For example, the propagation channel estimation frame 52 may be a frame including only a PHY part of a multiuser VHT packet structure (MU VHT Packet Structure) defined in the IEEE 802.11 standards, not information such as MAC. In this case, the propagation channel estimation frame 52 includes neither the MAC address of an access point to be a transmission source nor the MAC address of a wireless terminal to be a transmission destination. As an example of such a frame, an NDP (Null Data Packet) defined in the IEEE 802.11 standard may be used. Alternatively, a frame defined as an expanded NDP may be used. The certain period of time T1 may be any value as long as it is a predetermined certain period of time. As one example, a SIFS (Short Inter-frame Space) time (=16 μs), which is a time interval between frames regulated in the MAC protocol specification of the IEEE 802.11 wireless LAN can be used.

The plurality of wireless terminals 1 to 4 each receive the notification frame 51 transmitted from the access point 11. The wireless terminals 1 to 4 each analyze notification information in the notification frame 51 to recognize that the terminals themselves are specified as targets of channel estimation.

Each of the wireless terminals 1 to 4, which are specified as the targets of channel estimation, performs thereafter channel estimation on the basis of the channel estimation frame 52 received from the access point 11. Here, the channels to be estimated are downlink channels from the antennas of the access point 11 to the wireless terminals. The wireless terminal estimates the downlink channel to obtain the channel information representing a state of the channel from the access point to the wireless terminal.

The channel information may be, for example, channel state information (CSI: Channel State Information) (channel response matrix), may be components of a V matrix that is obtained through Singular Value Decomposition (hereafter referred to as SVD) of the channel state information (channel response matrix), or may be other information.

Any well-known method may be used as a method of estimating the channel information in each wireless terminal. For example, as will be described with reference to FIG. 8, the channel information such as the channel response matrix may be estimated by a model similar to that for channel responses of uplinks from the wireless terminals to the access point 11.

The wireless terminals 1 to 4 generate channel information frames 61, 62, 63, and 64 containing the obtained pieces of channel information, respectively. The wireless terminals 1 to 4 transmit the channel information frames 61, 62, 63, and 64 to the access point 11 in the same frequency band, respectively, after a certain period of time T2 from receiving the channel estimation frame 52. That is, the channel information frames transmitted by the wireless terminals are transmitted in an uplink multiuser MIMO manner that is spatially multiplexed. If the notification frame 51 contains information on the method of transmitting the channel information frames, the method of transmitting the channel information frames is determined according to the relevant information and the transmission is performed. A specific method of implementing the uplink multiuser MIMO manner of transmission will be described hereafter in detail. Note that, in the case of transmitting the channel state information (channel response matrix) to the access point as channel information, the pieces of channel state information (channel response matrices) may be decomposed in singular values on the access point side to obtain the V matrix.

Since, in the uplink multiuser MIMO, the wireless terminals do not share information on timings of transmission of the channel information frames, it is required to time the timings of the transmission by some method. In the first embodiment, the wireless terminals transmit the channel information frames after the lapse of SIFS from receiving the channel estimation frames from the access point. For this reason, it can be said that the transmission of the channel estimation frame from the access point practically serves as a trigger to time the timings of transmission in the uplink multiuser MIMO transmission.

Here, the propagation channel information frames 61, 62, 63, and 64 may be configured by, for example, the Management Frames defined in the IEEE 802.11 standards. In this case, the configuration of the Management Frame may have the configuration of a typical MAC frame, and may be, for example, a frame including a Frame Control field, a Duration field, an RA field, a TA field, a Frame Body field, an FCS field, and the like. In this case, the propagation channel information is stored in the Frame Body field. In addition, the RA field stores the MAC address of the access point, and the TA field stores the MAC address of the own terminal. The MAC address of the access point 11 to be set to the RA field may be an address that is set to the TA field in the notification frame 51, or may be the MAC address of the access point 11 that is known in advance. As a specific example of the channel information frame, the Compressed Beamforming frame defined in the IEEE 802.11 standard may be used. Alternatively, a frame defined by expanding the Compressed Beamforming frame may be used.

In addition, the certain period of time T2 may be any value as long as it is a predetermined certain period of time. As one example, the period of SIFS (Short Inter-frame Space) time (=16 μs), which is a time interval between frames regulated in the MAC protocol specification of the IEEE 802.11 wireless LAN can be used. The certain period of time T2 may have the same length as that of the certain period of time T1, or may have a different length therefrom.

The access point 11 receives the channel information frames 61 to 64 transmitted from the wireless terminals in the uplink multiuser MIMO transmission. The access point 11 calculates a beam pattern used for the downlink multiuser MIMO transmission by making use of the pieces of channel information on the wireless terminals contained in the channel information frames 61 to 64. For example, if obtaining the components of the V matrices from the wireless terminals as the pieces of channel information, the access point 11 may calculate a beam pattern for each antenna using the components as transmission weights. If obtaining the channel response matrices as the pieces of channel information, the access point 11 may decompose into singular values the channel response matrices to obtain the V matrices, and calculate a beam pattern for each antenna using the components of the V matrices as the transmission weights. The calculation of the beam pattern is not limited to the example here described, and any well-known method can be used therefor.

The access point 11 beam-transmits frames to the wireless terminals 1 to 4 based on the calculated beam patterns after the lapse of a certain period of time T3 from receiving the channel information frames 61 to 64. The downlink multiuser MIMO transmission is thereby realized. The access point 11 may once stop the transmission when the downlink multiuser MIMO transmission to the wireless terminals 1 to 4 continues for a predetermined period of time, or a certain amount of transmission is made, and may restart the process with the transmission of the notification frame 51. Alternatively, the access point 11 may restart the process with the transmission of the notification frame 51 if there is a change in the wireless terminals to be targets for transmission.

Here, the frames transmitted from the access point 11 to the wireless terminals 1 to 4 may be, for example, Data Frames defined in the IEEE 802.11 standards. In this case, the configuration of the Data Frames may have the configuration of a typical MAC frame, and may be, for example, a frame including a Frame Control field, a Duration field, an RA field, a TA field, a Frame Body field, an FCS field, and the like. In this case, data to be transmitted to the wireless terminal is stored in the Frame Body field. In addition, the RA field stores the MAC address of the wireless terminal, and the TA field stores the MAC address of the access point. The MAC addresses of the wireless terminals 1 to 4 to be set to the respective RA fields may be the MAC addresses that are set to the TA fields in the propagation channel information frames 61 to 64. The certain period of time T3 may be any value as long as it is a predetermined certain period of time. As one example, the period of SIFS (Short Inter-frame Space) time (=16 μs), which is a time interval between frames regulated in the MAC protocol specification of the IEEE 802.11 wireless LAN can be used. The certain period of time T3 may have the same length as that of the certain period of time T1 or T2, or may have a different length therefrom. Alternatively, the beam transmission may be made after obtaining right to transmission on the basis of CSMA/CA with carrier sensing, instead of using the certain period of time T3.

There will be described below in detail a manner the wireless terminals 1 to 4 perform the uplink multiuser MIMO transmission of the channel information frames to the access point 11.

Figure 3:
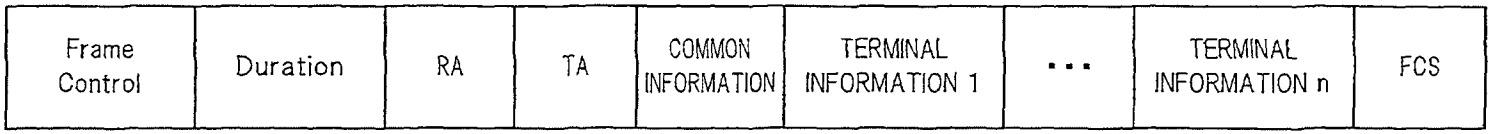
FIG. 3 is a diagram showing an example of a frame format of a notification frame.

FIG. 3 shows an example of a frame format of the notification frame 51.

The notification frame 51 contains, for example, a Frame Control field, a Duration field, an RA field, a TA field, a common information field, a terminal information field, and an FCS field.

In the Frame Control field, information representing a type of the frame or the like is set.

In the Duration field, a time set as a virtual carrier sense is stored. A device that receives a frame containing the Duration field having a value set counts down until the time set to this field reaches zero, and recognizes that the channel is busy until the time set reaches zero. This is called the virtual carrier sense.

In the RA (Receiver Address) field, a MACaddress of a transmission destination of the frame is normally set. Since the notification frame 51 is transmitted addressed to a plurality of wireless terminals, a broadcast address may be set to the RA field. Note that a multicast address or a MAC address of the wireless terminal (unicast address) may be set to the RA instead of the broadcast address. In the case of setting the unicast address, a plurality of RA fields may be set to specify a plurality of addresses.

In the TA (Transmitter Address) field, a MAC address of a transmission source of the frame is contained. In the present embodiment, for example, a MAC address of the access point is set thereto.

In the common information field, information that should be notified commonly to the wireless terminals to be targets of channel estimation (i.e., the wireless terminals to be the targets of the downlink multiuser MIMO transmission) is set, as information needed to perform the uplink multiuser MIMO transmission. If the notification frame 51 is formed by expanding the NDPA frame defined in the IEEE 802.11 standard, it can be realized by adding the common information field to any place in the NDPA frame.

The terminal information field (individual information field) is provided for each wireless terminal to be a target of channel estimation. The number of the terminal information fields can vary depending on the number of wireless terminals to be targets of channel estimation. In the example of FIG. 2, the number of the provided terminal information fields is four. That is, a terminal information field 1, a terminal information field 2, a terminal information field 3, and a terminal information field 4 are provided.

The terminal information field contains identification information on the wireless terminal to be a target of channel estimation, and individual information unique to the wireless terminal in question as information needed for performing the uplink multiuser MIMO transmission of the channel information frame. If the notification frame 51 is formed by expanding the NDPA frame regulated in the IEEE 802.11 standard, it may be realized by the terminal information field being a subfield in an STA info field in the NDPA frame. It is conceivable as a modification that the pieces of identification information of the wireless terminals to be targets of channel estimation are set to the common information fields instead of the terminal information fields. The identification information on the wireless terminal is not limited to specific information as long as the identification information allows the wireless terminal to be distinguished, and for example, any ID can be used that allows a terminal to be distinguished, such as a MAC address and an Association ID (AID).

In the FCS (Frame Check Sequence) field, FCS information on the notification frame 51 is set. The FCS information is used for frame error detection on the reception device side.

Figure 4:
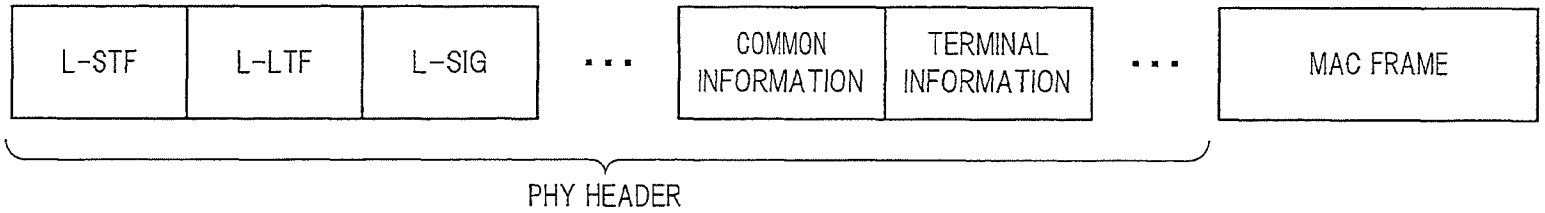
FIG. 4 is a diagram showing another example of the frame format of the notification frame.

The terminal information field and the common information field in the notification frame shown in FIG. 3 may be disposed in the MAC header or the frame body part of a MAC frame. The terminal information field and the common information field are set in the MAC frame in the case described here, and as shown in FIG. 4, the terminal information field and the common information field may be set to a PHY header that is added on the leading side of the MAC frame. The PHY header includes an L-STF (Legacy-Short Training Field), an L-LTF (Legacy-Long Training Field), an L-SIG (Legacy Signal Field), the common information field, and the terminal information field. The L-STF, L-LTF, and L-SIG are, for example, a field that can be recognized in legacy standards such as the IEEE802.11a, and contain information on signal detection, frequency correction, transmission rate, and the like. The following description assumes that the notification frame has a format shown in FIG. 3.

The access point 11 transmits the notification frame 51 having the format as shown in FIG. 3. The wireless terminal that receives the notification frame 51 can detect that the wireless terminal itself is specified as a target of channel estimation when identification information on the wireless terminal itself is contained in any of the terminal information fields (or the common information fields) in the notification frame 51.

In addition, the wireless terminals each obtain information needed for performing the uplink multiuser MIMO transmission, from the common information field and the terminal information field. The wireless terminal can thereby detect a method of transmitting which the wireless terminal itself should use for performing the uplink multiuser MIMO transmission of the channel information frame. The uplink multiuser MIMO transmission of the channel information frame is thereby possible.

There will be described below in detail the information (common information and individual information) notified to the wireless terminals by the access point 11 with the notification frame 51, which is needed to perform the uplink multiuser MIMO transmission.

The access point 11 receives the channel information frames transmitted in the uplink multiuser MIMO from the wireless terminal at the same time as multiplexed signals, and these frames therefore need to be spatially separated. In the present embodiment, the wireless terminals store preambles (bit streams) having patterns orthogonal to one another in preamble fields in the channel information frames to be transmitted. The access point 11 detects in advance the preambles of the channel information frames, and estimates channel responses in uplinks from the wireless terminals to the access point 11 by making use of the preambles in the channel information frames received from the wireless terminals. For example, the access point 11 estimates channel response matrices (channel response matrices of the uplinks) from the antennas of the wireless terminals to the antennas of the access point. The access point correctly separates fields (e.g., data field) subsequent to the preambles in the channel information frames received from the wireless terminals by using the estimated channel response matrices of the uplinks. This can be done by using any well-known methods such as the ZF (Zero-Forcing) method, the MMSE (Minimum Mean Square Error) method, and the maximum likelihood estimation method.

Here, the access point 11 can determine, as one example, the preambles that the wireless terminals make use of, using an orthogonal matrix, in order to cause the wireless terminals to transmit preambles that are orthogonal to one another. An example of the orthogonal matrix is shown below.

$$\begin{bmatrix} 1 & -1 \\ 1 & 1 \end{bmatrix} \quad (1)$$

$$\begin{bmatrix} 1 & -1 & 1 & 1 \\ 1 & 1 & -1 & 1 \\ 1 & 1 & 1 & -1 \\ -1 & 1 & 1 & 1 \end{bmatrix} \quad (2)$$

A matrix (1) is an example of the orthogonal matrix in the case where the spatial multiplexing number is two (i.e., a 2×2 matrix). A matrix (2) is an example of the orthogonal matrix in the case where the spatial multiplexing number is four (corresponding to the example of FIG. 1) (i.e., a 4×4 matrix). The orthogonal matrix has a characteristic in that row (or column) vectors represented by respective rows (or columns) are orthogonal to one another. The orthogonality of vectors means that their inner product is zero. In addition, the spatial multiplexing number refers to the number of the data streams to be spatially multiplexed.

Each wireless terminal configures a preamble based on one of different rows (or columns) in the orthogonal matrix based on the spatial multiplexing number, which realizes a configuration of the preambles orthogonal (in the case where the number of streams of each wireless terminal is one). That is, while receiving the preamble signals at the same time in a multiplexed state from the wireless terminals, the access point can correctly estimate the channel response matrices (the channel response matrices of the uplinks) because the preambles are orthogonal to one another.

Figure 5:
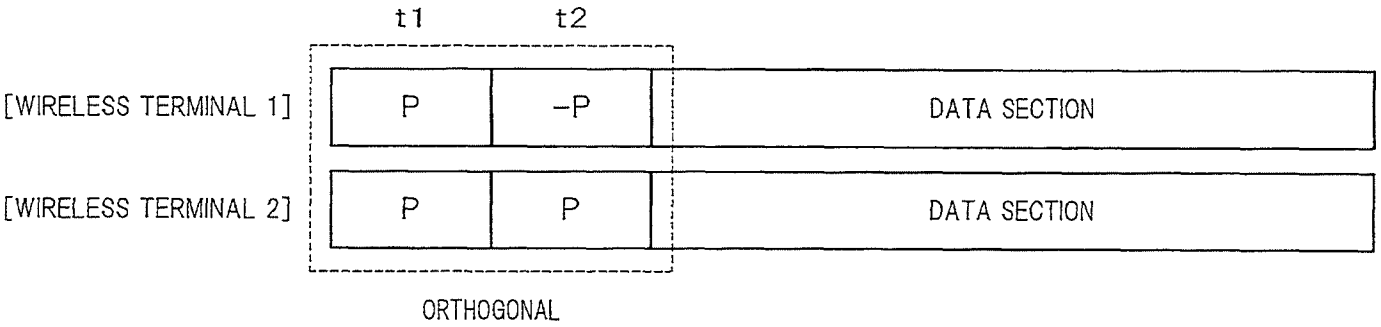
FIG. 5 is a diagram showing a schematic configuration example of channel information frames from the wireless terminals in the case where the spatial multiplexing number is two.

FIG. 5 shows a schematic configuration example of the channel information frames of the wireless terminals 1 and 2 in the case where the spatial multiplexing number is two. The channel information frames each contain a preamble section and a data section. The preamble section corresponds to a bit stream stored in the preamble field, and the data section corresponds to a bit stream stored in the data field. As one example, the preamble field is included at a head of the channel information frame. Note that, as will be described hereafter, another type of field may be included at the head. The data field is included subsequent to the preamble field. Another field (e.g., the Frame Control field, the Duration field, the RA field, and the TA field) may exist between the preamble field and the data field.

In the data fields in the channel information frames, data such as the channel information estimated by the wireless terminals 1 and 2 are stored.

In the preamble fields of the channel information frames, the preamble sections (bit patterns) generated with the orthogonal matrices are stored. The preamble section is formed by a plurality of segments, in which "P" or "−P" are disposed in accordance with a value of the corresponding row (or column) in the orthogonal matrix, along a direction of the frame. The preamble [P, −P] of the wireless terminal 1 corresponds to [1, −1] of the first row in the matrix (1), and the preamble [P, P] of the wireless terminal 2 corresponds to [1, 1] of the second row in the matrix (1).

One segment corresponds to at least one modulation symbol. One segment corresponds to a symbol period. Any scheme such as BPSK, QPSK, and QAM may be used for a modulation scheme of a symbol. The preamble of the wireless terminal 1 is [P, −P]. The preamble of the wireless terminal 2 is [P, P]. The [P, −P] and [P, P] are orthogonal to each other. The "P" and "−P" are elements each consisting of a bit stream having a length of one bit or more. As one example, the modulation symbol of the bit stream P and the modulation symbol of the bit stream −P are in a relation of the same amplitude and a phase difference of 180 degrees (a relation in which they cancel each other out).

In FIG. 5, "t1" and "t2" represent timings for the transmission of the bit streams of the corresponding segments in the preamble. At the timing t1, the bit stream P of the first segment in the preamble of the wireless terminal 1 is transmitted with a modulation symbol (a first modulation symbol) based on a modulation scheme, while the bit stream P of the first segment in the preamble of the wireless terminal 2 is transmitted with the same first modulation symbol of the wireless terminal 1. Likewise, at the timing t2, the bit stream −P of the second segment in the preamble of the wireless terminal 1 is transmitted with a modulation symbol (a second modulation symbol, e.g., a symbol having the same amplitude as that of the first modulation symbol and having a phase opposite to that of the first modulation symbol) based on the modulation scheme, while the bit stream P of the second segment in the preamble of the wireless terminal 2 is transmitted with the first modulation symbol.

Figure 6:
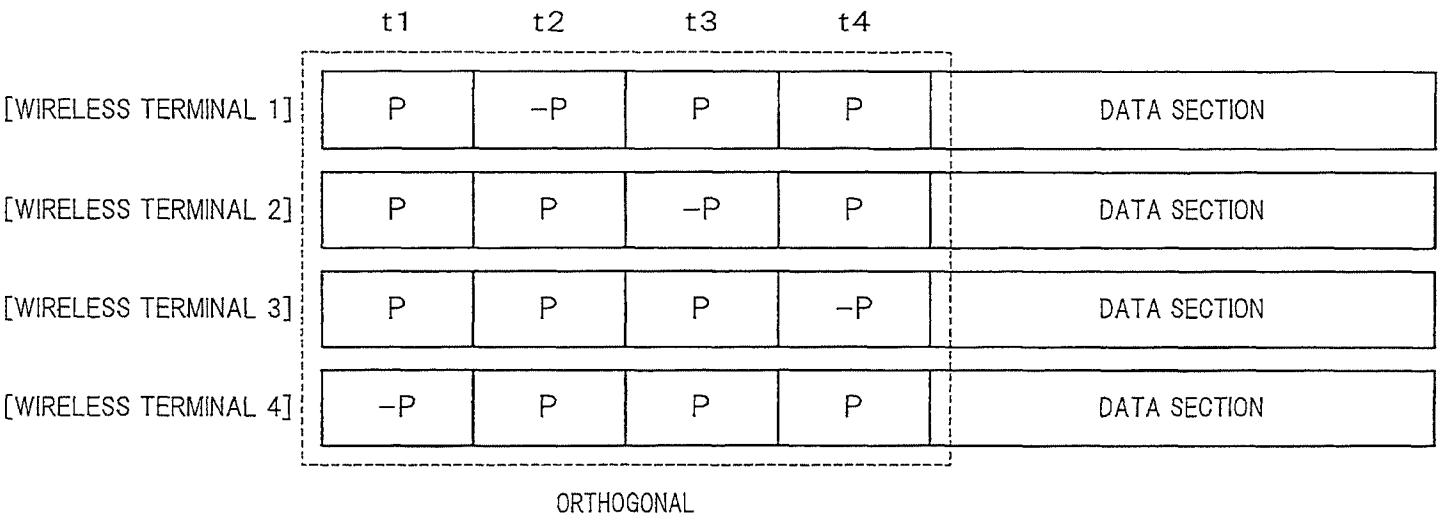
FIG. 6 is a diagram showing a schematic configuration example of channel information frames from the wireless terminals in the case where the spatial multiplexing number is four.

FIG. 6 shows an example of the channel information frames of the wireless terminals 1 to 4 in the case where the spatial multiplexing number is four.

In the data fields in the respective channel information frames, data such as the channel information estimated by the wireless terminals 1 to 4 are stored. The data field is actually a MAC frame, and data on the propagation channel information and the like is stored in the frame body part or the MAC header of the MAC frame.

In the preamble fields of the respective channel information frames, preambles (bit patterns) generated with the orthogonal matrices are stored. The preamble field is included in, for example, the PHY header that is included on the leading side of the MAC frame. For example, in the case where the first row in the matrix (2) is used, the preamble of the wireless terminal 1 is [P, −P, P, P], which corresponds to [1, −1, 1, 1] of the first row in the matrix (2) for the spatial multiplexing number of four. Likewise, the preamble of the wireless terminal 2 is [P, P, −P, P], which corresponds to [1, 1, −1, 1] of the second row in the matrix (2). Likewise, the preamble of the wireless terminal 3 is [P, P, P, −P], which corresponds to [1, 1, 1, −1] of the third row in the matrix (2). The preamble of the wireless terminal 4 is [−P, P, P, P], which corresponds to [−1, 1, 1, 1] of the fourth row in the matrix (2). The timings "t1," "t2," "t3," and "t4" in the drawing represent timings at which the bit stream (P or −P) of each segment in the preamble is transmitted.

Taking the spatial multiplexing number of two as an example (refer to FIG. 5), there will be described with reference to FIG. 8 the manner channel estimation of the uplinks from the wireless terminals 1 and 2 to the access point 11 is performed on the basis of the preambles in the channel information frames.

Figure 8:
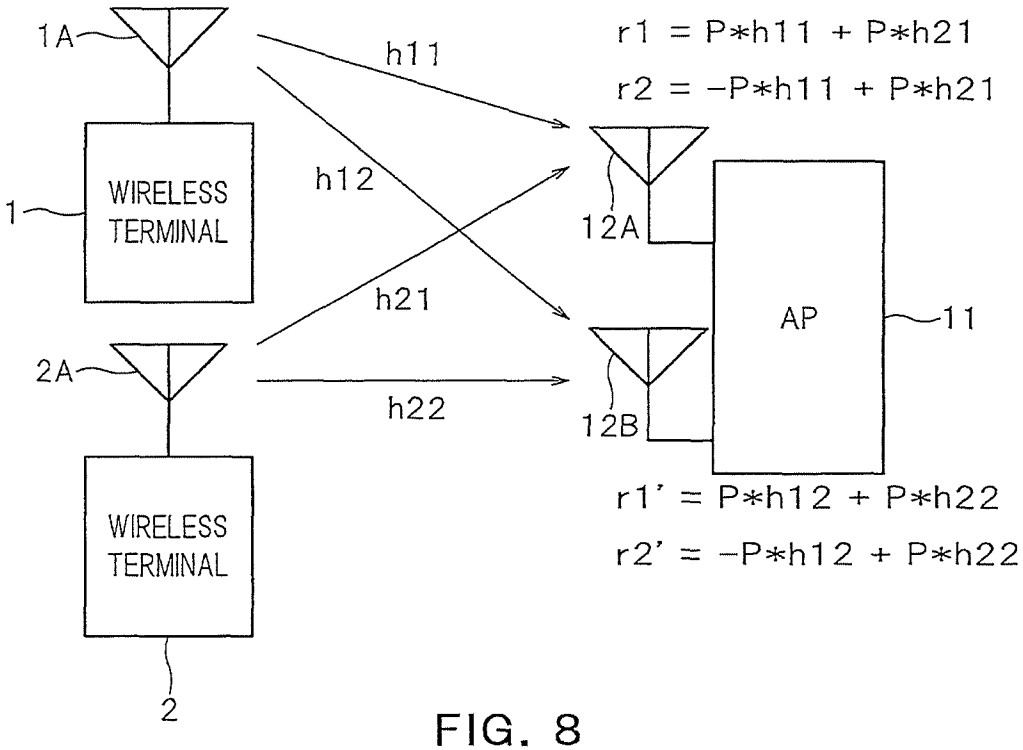
FIG. 8 is a diagram illustrating a manner to perform channel estimation of uplinks from the plurality of wireless terminals to the access point.

As shown in FIG. 8, the channel responses in the uplinks from the antennas 1A and 2A of the wireless terminals 1 and 2 to the antennas 12A and 12B of the access point 11 are denoted by h11, h12, h21, and h22, respectively.

Now, the bit streams "P" and "P" of the first segments of the preambles are transmitted from the respective antennas 1A and 2A of the two wireless terminals 1 and 2, with the first modulation symbol, at the timing t1 shown in FIG. 5. A first modulation symbol signal of "P" transmitted from the antenna 1A of the wireless terminal 1 is received at the antennas 12A and 12B under the influence of the channel response h11 to the antenna 12A and of the channel response h12 to the antenna 12B of the access point 11. Likewise, a first modulation symbol signal of the bit stream "P" from the antenna 2A of the wireless terminal 2 is received at the antennas 12A and 12B under the influence of the channel response h21 to the antenna 12A and the channel response h22 to the antenna 12B of the access point 11. The received signal of the antenna 12A of the access point 11 can be therefore expressed as r1=P*h11+P*h21, and the received signal of the antenna 12B can be expressed as r1'=P*h12+P*h22.

Likewise, the bit streams "−P" and "P" of the second segments of the preambles are transmitted from the respective antennas 1A and 2A of the two wireless terminals 1 and 2, with the second modulation symbol and the first modulation symbol, respectively, at the timing t2 shown in FIG. 5. A second modulation symbol signal of "−P" transmitted from the antenna 1A of the wireless terminal 1 is received at the antennas 12A and 12B under the influence of the channel response h11 to the antenna 12A and of the channel response h12 to the antenna 12B of the access point 11. Likewise, a first modulation symbol signal of "P" transmitted from the antenna 2A of the wireless terminal 2 is received at the antennas 12A and 12B under the influence of the channel response h21 to the antenna 12A and of the channel response h22 to the antenna 12B of the access point 11. The received signal of the antenna 12A can be therefore expressed as r2=−P*h11+P*h21, and the received signal of the antenna 12B can be expressed as r2'=−P*h12+P*h22.

The access point 11 can calculate the channel responses h11 and h21 by performing addition or subtraction of the received signals r1 and r2 of the antenna 12A, For example, with respect to h11, subtracting r2 from r1 results in r1−r2=2P*h11. The signal P is known, and the received signals r1 and r2 are measurable. The h11 is therefore obtained. With respect to h21, adding r1 and r2 results in r1+r2=2P*h21. The signal P is known, and the received signals r1 and r2 are measurable. The h21 is therefore obtained.

Likewise, with respect to the received signals r1' and r2' of the antenna 12B, the access point 11 can calculate the channel responses h12 and h22 by performing addition or subtraction therebetween.

On the basis of the channel responses h11, h12, h21, and h22 calculated in the above-described manner, the access point 11 can obtain a channel response matrix (channel response matrix of the uplinks) expressed by the expression (3) as follows.

$$H = \begin{bmatrix} h_{11} & h_{12} \\ h_{21} & h_{22} \end{bmatrix} \tag{3}$$

By using this channel response matrix (channel response matrix of the uplinks), the data streams transmitted from the antenna 1A of the wireless terminal 1 and the antenna 2A of the wireless terminal 2 can be separated. That is, the access point 11 can correctly spatially separate the data sections disposed subsequent to the preamble sections in the channel information frames received from the wireless terminals 1 and 2, with respect to the wireless terminals 1 and 2.

Even in the case where the spatial multiplexing number is not two, the channel response matrix of the uplinks can be correctly estimated on the access point 11 side, by the allocation of preambles orthogonal to one another to the wireless terminals using the orthogonal matrix corresponding to the spatial multiplexing number. For example, as shown in FIG. 6, in the case where the spatial multiplexing number is four, each wireless terminal configures the preamble with a pattern based on the corresponding row (or column) using the orthogonal matrix (2), which allows the access point 11 to correctly estimate the channel response matrix of the uplinks. The access point 11 can correctly separate the data sections in the channel information frames transmitted from the wireless terminals in the spatial multiplexing of the uplinks by using the estimated channel response matrix of the uplinks.

Here, to correctly estimate the channel response matrix (channel response matrix of the uplinks), the wireless terminals need to ensure the use of the orthogonal preambles. Supposing that two or more of the wireless terminals use the preambles based on the same row (or column) of the orthogonal matrix, the patterns of the preambles received at the access point are not orthogonal to one another, and the correct channel response matrix (the channel response matrix of the uplinks) cannot be therefore obtained. In the case of a regular MIMO transmission, rather than the multiuser MIMO transmission, a plurality of data streams are transmitted by one wireless terminal including a plurality of antennas, which allows the wireless terminal that performs the MIMO transmission to apply different patterns to data streams to be transmitted at its own discretion. In the case of the uplink multiuser MIMO, however, since different wireless terminals transmit the data streams, each wireless terminal cannot detect which row (or column) of the orthogonal matrix the pattern used by the other wireless terminal is based on.

Hence, in the present embodiment, the access point 11 determines the preambles used by the wireless terminals, making them different from one another, and notifies of information on the preambles that the wireless terminals should use, in the terminal information fields of the notification frame 51. It is thereby possible to ensure that the wireless terminals use the preambles different from one another. The wireless terminals each use the preamble specified to itself with the notification frame 51. The preambles in the channel information frames that the access point 11 receives from the wireless terminals are thereby orthogonal to one another. This allows the access point 11 to correctly estimate the channel response matrix of the uplinks by making use of these preambles. The access point 11 can obtain the pieces of the channel information estimated by the wireless terminals on the basis of the data sections by making use of the channel response matrix of the uplinks to spatially separate the data sections in the channel information frames properly.

There will be described below in specific the manner the access point 11 notifies the preamble to be used by each wireless terminal with the notification frame 51.

The access point 11 sets pieces of assignment information on the preambles used by the wireless terminals to the terminal information fields in the notification frame 51. As a result, the identification information on the wireless terminals and the assignment information on the preambles used by the wireless terminals are contained in the terminal information fields of the notification frame 51.

As an example of the assignment information on the preambles, row numbers (or column numbers) of the orthogonal matrix may be used. For example, the row number (or column number) used by the wireless terminal 1 is stored in the terminal information field 1. The wireless terminal 1 identifies the preamble to use on the basis of the row (or column) of the number stored in the terminal information field 1. If the row number 1 is assigned when the orthogonal matrix is the matrix (1), [P, −P] is determined as the preamble to use.

Instead of the method of explicitly notifying the row number (or column number) in such a manner, a method of implicit notification can be used. There is a method of indirectly notifying a row number (or column number), for example, with the field number of the terminal information field as an implicit notification. For example, the wireless terminal specified with the terminal information field 1 (i.e., the wireless terminal of which identification information is set in the terminal information field 1) uses the first row in the orthogonal matrix, the wireless terminal specified with the terminal information field 2 uses the second row in the orthogonal matrix, . . . , and the wireless terminal specified with the terminal information field n uses the n-th row in the orthogonal matrix.

Here, the wireless terminals to which the row number has been notified explicitly or indirectly each refer to the orthogonal matrix to identify the preamble that the wireless terminals use. Thus, the wireless terminals need to obtain the orthogonal matrix to refer to. Obtaining methods may include one in which the access point 11 stores the orthogonal matrix in the common information field of the notification frame 51, and the wireless terminals each read out the orthogonal matrix from the common information field to obtain it. Alternatively, the orthogonal matrix predetermined in the wireless communication standard to be applied may be stored in a memory device or the like of each wireless terminal in advance. Alternatively, the access point 11 may notify the orthogonal matrix at the time of establishing wireless links with the wireless terminals. Alternatively, the notification may be provided through other methods.

The preamble used by the wireless terminals differs depending on the spatial multiplexing number (the number of transmission streams) even if the same row number is notified to the wireless terminal. For example, since the matrix (1) is used in the case where the spatial multiplexing number is two, the preamble is [P, −P] if the row number 1 is specified. Likewise, since the matrix (2) is used in the case where the spatial multiplexing number is four, the preamble is [P, −P, P, P] if the row number 1 is specified. For this reason, a scheme is needed so that the wireless terminal side can identify which orthogonal matrix to use. Note that if the spatial multiplexing number is fixed, a fixed orthogonal matrix may be used, which does not raise such a problem.

As one example of such a scheme, data of the orthogonal matrix to use is consecutively notified with the common information field. In this case, the notified orthogonal matrix may be used.

As another method, the access point 11 may notify the spatial multiplexing number (the total number of transmission streams) in the uplink multiuser MIMO transmission of the channel information frames, with the common information field in the notification frame 51. The reason the common information field is used instead of the terminal information fields is that the total number of transmission streams is not information unique information to each wireless terminal but is information common to the wireless terminals. In an example of FIG. 2, since the total number of transmission streams is four, the assignment information on the total number of transmission streams of four is contained in the common information field. The wireless terminals each read out the common information field at the time of receiving the notification frame 51 to detect the total number of streams of four. The wireless terminals manage the orthogonal matrices in accordance with the various number of streams, and identifies the orthogonal matrix (the above matrix (2)) corresponding to the total number of streams of four.

In addition to the method of explicitly notifying the total number of streams that has been described above, an implicit notification method is possible. This is a method of indirectly identifying the total number of streams on the basis of the total number of wireless terminals to be targets of channel estimation, that is, the number of the terminal information fields. As shown in FIG. 2, in the case where the transmission performed by each wireless terminal that performs the uplink multiuser MIMO transmission is limited to one stream, a user multiplexing number is equal to the total number of transmission streams. The number of the terminal information fields in the notification frame 51 is therefore equal to the total number of transmission streams. Thus, the wireless terminals can identify the orthogonal matrix to use by counting the number of the terminal information fields at the time of receiving the notification frame 51.

Note that the notification frame 51, the channel information frame, or the like may contain, in addition to the fields shown in FIG. 3, FIG. 5, or FIG. 6, other types of fields such as a Signal field and a synchronization field used for synchronization. The Signal field can contain, for example, frame configuration information such as a total length of the frame and a modulation scheme to apply. The Signal field and the synchronization field are contained in the PHY header that is disposed on the leading side of the MAC frame. As described above, the preamble field may be also disposed in this PHY header.

Figure 7:
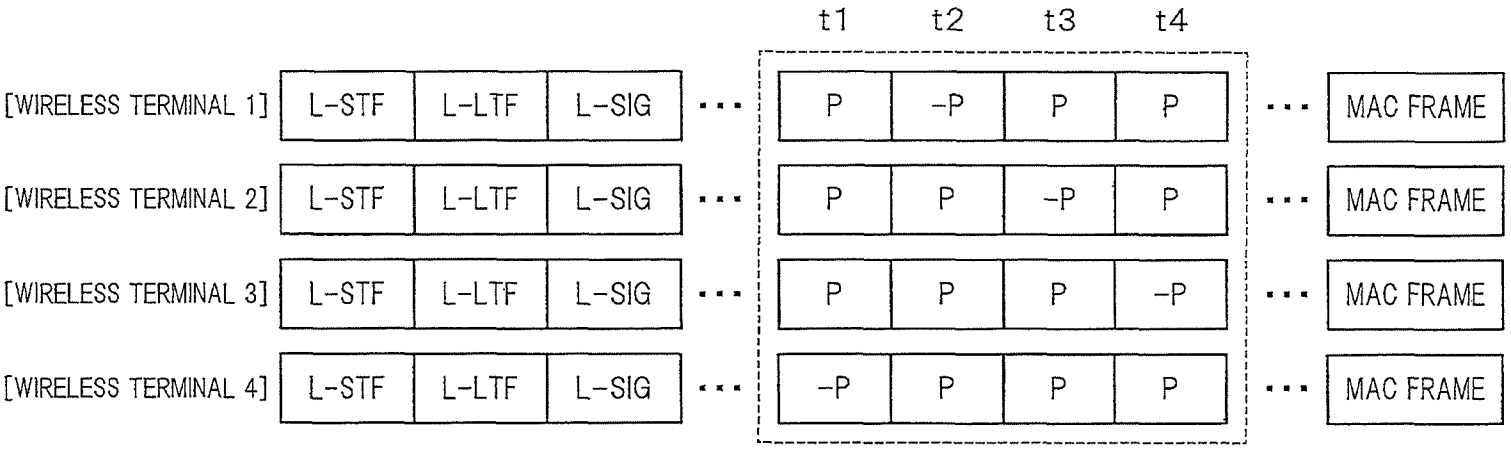
FIG. 7 is a diagram showing another configuration example of the propagation channel information frames from the wireless terminals in the case where the spatial multiplexing number is four.

FIG. 7 shows an example of a frame format in which the PHY header containing the other fields such as the Signal field and the synchronization field and the preamble field is disposed on the leading side of the MAC frame of the propagation channel information frame. Note that the other fields such as the Signal field and the synchronization field may be disposed prior to the preamble field in the channel information frame. In this case, only a certain wireless terminal may transmit the information on the other fields so as to prevent interference between the wireless terminals. Alternatively, the wireless terminals may consecutively transmit the other fields so as to avoid temporal overlaps. Alternatively, all the wireless terminals may set the same information to these fields, and may transmit them at the same time. Alternatively, the other fields may be disposed immediately subsequent to the preamble field. In this case, the access point 11 can spatially separate the other fields among the wireless terminals by using the channel response matrix (channel response matrix of the uplinks) estimated on the basis of the preamble fields.

The access point 11 may also notify, as necessary, information on a method of transmitting the other fields or the disposition thereof with the terminal information fields in the notification frame 51, to the wireless terminals. In this case, the wireless terminals dispose the other fields to generate frames by the method specified with the notification frame 51.

Figure 9:
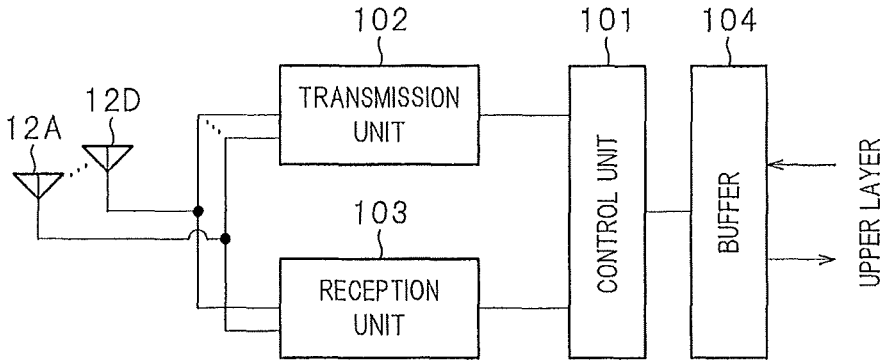
FIG. 9 is a functional block diagram of a wireless communication device installed in the access point.

FIG. 9 is a functional block diagram of a wireless communication device of the access point 11. As described above, the access point 11 may be connected to a plurality of networks including the network on the wireless terminal side (first network) and the other network (second network). FIG. 9 shows a configuration of the wireless communication device on the first network side.

The wireless communication device includes a control unit 101, a transmission unit 102, a reception unit 103, antennas 12A, 12B, 12C, and 12D, and a buffer 104. The control unit 101 corresponds to the communication controlling device that controls communication with the wireless terminals, and the transmission unit 102 and the reception unit 103 form, as one example, a wireless communication unit. All or a part of the processes of the control unit 101, and digital domain processes of the transmission unit 102 and the reception unit 103, or the process of the communication controlling device may be executed by software (a program) that runs on a processor such as a CPU, may be executed by hardware, or may be executed by both the software and the hardware. The access point may include a processor that performs the all or a part of the processes of the control unit 101, the transmission unit 102, and the reception unit 103, or the process of the communication controlling device.

The buffer 104 is a storage used for exchanging data frames between an upper layer and the control unit 101. The buffer 104 may be a volatile memory such as a DRAM, or a non-volatile memory such as a NAND or an MRAM. The upper layer stores in the buffer 104 frames received through the second network to relay them to the first network, or receives frames that are received through the first network, from the control unit 101. The upper layer may perform a communication process in layers higher than the MAC layer such as TCP/IP and UDP/IP. In addition, the upper layer may perform a process in the application layer for processing data. The processing of the upper layer may be performed by software (program) processing that a processor such as a CPU executes, may be performed by hardware, or may be performed by both the software and the hardware.

The control unit 101 mainly performs processing in the MAC layer and part of processing in the physical layer (e.g., a process relating to MIMO). The control unit 101 transmits and receives frames via the transmission unit 102 and the reception unit 103 to perform a communication control over the wireless terminals in the first network. In addition, the control unit 101 may perform a control so as to periodically transmit a beacon frame. The control unit 101 may include a clock generation unit. In addition, the control unit 101 may be configured so as a clock is input from the outside. The control unit 101 may manage the internal time thereof by the clock and may output the clock generated by the clock generation unit to the outside.

The control unit 101 establishes a wireless link with the wireless terminal, through a process such as authentication as necessary, upon receiving an association request from the wireless terminal. The control unit 101 periodically checks the buffer 104. Alternatively, the control unit 101 checks the buffer 104 in response to a trigger from the outside such as the buffer 104. Upon confirming that the buffer 104 has frames to be transmitted to one or more wireless terminals, the control unit 101 generates the notification frame (refer to reference numeral 51 of FIG. 2) containing the notification information that specifies these wireless terminals. In addition, the control unit 101 sets, to the common information field or the terminal information fields in the notification frame, or to both fields, the information (common information, individual information, or both types of information) to specify the method of transmitting the channel information frame to the wireless terminal, as necessary.

The control unit 101 transmits the generated notification frame from the transmission unit 102 in accordance with a method of transmission to use. As one example, the control unit 101 outputs the generated notification frame 51 to the transmission unit 102 upon obtaining a right to transmission through the carrier sense. The transmission unit 102 includes transmission systems corresponding to the antennas, and performs a desired process in the physical layer such as a modulation process or an addition of a physical header, with respect to the input notification frame 51, using a certain transmission system. In addition, the transmission unit 102 performs a DA conversion, a filtering process to extract a signal component in a desired band, and a frequency conversion, to the frame that has been processed in the physical layer. The transmission unit 102 amplifies the frequency-converted signal and radiates the signal as radio waves into space through any one of the antennas. Note that a configuration in which the notification frame 51 is input into a plurality of transmission systems and transmitted through a plurality of antennas may also be possible.

In addition, the control unit 101 performs a control so as to transmit the channel estimation frame 52 after the lapse of the certain period of time from transmitting the notification frame 51. The control unit 101 generates the channel estimation frame for each of the transmission systems corresponding to antennas such that the channel estimation frame 52 is transmitted with the signals orthogonal to one another through the antennas. The transmission unit 102 modulates the channel estimation frame for each transmission system. The transmission unit 102 performs processes in the physical layer such as the addition of physical headers to modulated signals using the transmission systems, and performs the DA conversion, the filtering process to extract a signal component in a desired band, and the frequency conversion (upconversion) to the frame that has been processed in the physical layer. The transmission unit 102 further amplifies the frequency-converted signals for each transmission system, and radiates the signals as radio waves into space through the corresponding antennas.

The signals received at the antennas are processed by the reception unit 103 for each of reception systems corresponding to the antennas. For example, the signals of the channel information frames returned from the plurality of wireless terminals specified with the notification frame 51 are received at the antennas (uplink multiuser MIMO reception) at the same time after transmitting the above-described channel estimation frame 52. The received signals of the antennas are input into the reception systems in the reception unit 103. The received signals are amplified by the respective reception systems, frequency-converted (downconverted), and the desired band components thereof are extracted through the filtering process. The extracted signals are further converted into digital signals through an AD conversion, subjected to processing in the physical layer such as demodulating, and thereafter input into the control unit 101.

The control unit 101 performs channel estimation on the basis of the preambles of the signals input from the reception systems to obtain the channel response matrix of the uplinks. The control unit 101 separates the data sections subsequent to the preambles for each wireless terminal (for each channel information frame) on the basis of the channel response matrix of the uplinks obtained through estimation, and reads out the channel information of the downlinks from the data sections. The channel information can be the components of the channel state information (channel response matrix) or of the V matrix.

The control unit 101 reads out the frames addressed to the wireless terminals from the buffer 104, subjects them to the process in the MAC layer, and transmits them to the transmission unit 102. In addition, the control unit 101 calculates transmission weights of the transmission systems on the basis of the pieces of channel information obtained from the wireless terminals, and transmits them to the respective transmission systems of the transmission unit 102. The transmission unit 102 obtains information on the transmission weights for the respective transmission systems. The transmission unit 102 modulates the frame for each transmission systems, and multiplies the modulated signals by the transmission weights corresponding to the transmission systems. Each transmission system performs processes in the physical layer such as the addition of the physical header to the multiplied signal, performs the DA conversion and the filtering process to extract a signal component in a desired band, and performs the frequency conversion (upconversion) to the frame that has been processed in the physical layer. Each transmission system further amplifies the frequency-converted signal, and radiates the signals as radio waves into space through the corresponding antennas. The downlink multiuser MIMO transmission to the wireless terminals is thereby performed.

The control unit 101 may access a storage device that stores pieces of information to be transmitted to the wireless terminals, or pieces of information received from the wireless terminals, to read the pieces of information. The storage device may be either an internal memory or an external memory, and either a volatile memory or a non-volatile memory. In addition, the storage device may be an SSD, a hard disk, or the like instead of a memory.

The above-described manner of dividing processes into those performed by the control unit 101 and the transmission unit 102 is one example, and another manner of dividing also being possible. For example, the control unit 101 may perform processes within a digital domain, and the transmission unit 102 may perform processes subsequent to the DA conversion. With respect to the manner of dividing processes into those performed by the control unit 101 and the reception unit 103, likewise, the reception unit 103 may perform processes up to the A/D conversion, and the control unit 101 may perform processes within the digital domain subsequent thereto, including processes in the physical layer. A manner of dividing other than those described here may be employed.

Figure 10:
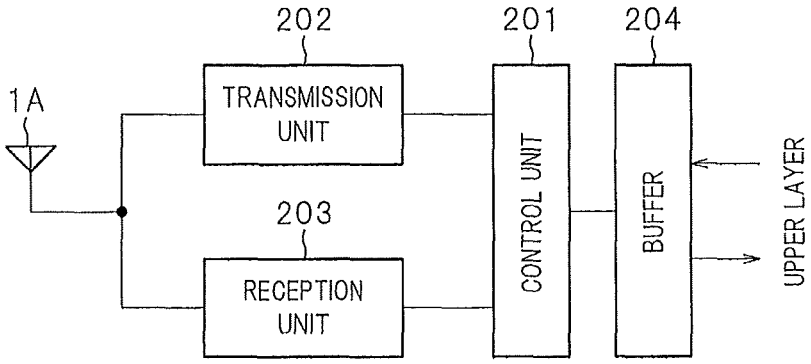
FIG. 10 is a functional block diagram of a wireless communication device installed in the wireless terminal.

FIG. 10 is a functional block diagram of the wireless communication device installed in the wireless terminal 1. The wireless communication devices installed in the wireless terminals 2 to 4 each also have the configuration of the wireless terminal 1, thus the description for the wireless terminal 1 below will be therefore used instead of those for the wireless terminals 2 to 4.

The wireless communication device includes a control unit 201, a transmission unit 202, a reception unit 203, an antenna 1A, and a buffer 204. The control unit 201 corresponds to the communication controlling device that controls communication with the access point 11, and the transmission unit 202 and the reception unit 203 form, as one example, a wireless communication unit. All or a part of the process of the process of the control unit 201, and digital domain processes of the transmission unit 202 and the reception unit 203, or the process of the communication controlling device may be executed by software (a program) that runs on a processor such as a CPU, may be executed by hardware, or may be executed by both software and hardware. The wireless terminal may include a processor that performs the all or a part of the processes of the control unit 201, the transmission unit 202, and the reception unit 203, or the process of the communication controlling device.

The buffer 204 is a storage for exchanging data frames between an upper layer and the control unit 201. The buffer 204 may be a volatile memory such as a DRAM, or a non-volatile memory such as a NAND or an MRAM. The upper layer generates frames to be transmitted to the other wireless terminals, the access point 11, or a device such as a server in the other network, and stores the frames in the buffer 204, or receives frames that are received on the first network, via the buffer 204. The upper layer may perform a communication process in layers higher than the MAC layer such as TCP/IP and UDP/IP. In addition, the upper layer may perform a process in the application layer for processing data. The processing of the upper layer may be performed by software (program) processing that a processor such as a CPU executes, may be performed by hardware, or may be performed by both software and hardware.

The control unit 201 mainly performs MAC layer processing. The control unit 201 transmits/receives frames to/from the access point 11 via the transmission unit 202 and the reception unit 203 to perform a communication control with the access point 11. The control unit 201 receives, for example, the beacon frame periodically transmitted from the access point 11 via the antenna 1A and the reception unit 203. The control unit 201 may include a clock generation unit. In addition, the control unit 201 may be configured to receive a clock from the outside. The control unit 201 may manage the internal time thereof by the clock and may output the clock generated by the clock generation unit to the outside.

The control unit 201 makes an association request to the access point 11, as one example, upon receiving a beacon frame, and establishes a wireless link with the access point 11 through a process such as authentication as necessary. The control unit 201 periodically checks the buffer 204. Alternatively, the control unit 201 checks the buffer 204 in response to a trigger from the outside such as the buffer 204. Upon confirming that there is a frame to be transmitted to the access point 11, the control unit 201 reads out the frame, transmitting it to the transmission unit 202 via the antenna 1A in accordance with a method of transmission to use. The transmission unit 202 performs a process in the desired physical layer such as a modulating process or an addition of a physical header with respect to the frame received from the control unit 201. In addition, the transmission unit 202 performs a DA conversion, a filtering process to extract a signal component in a desired band, and a frequency conversion (upconversion), to the frame that has been subjected to the process in the physical layer. The transmission unit 202 amplifies the frequency-converted signal and radiates the signal as radio waves into space through the antenna.

The signal received at the antenna 1A is processed by the reception unit 203. For example, the signal of the notification frame from the access point 11 is received, and processed by the reception unit 203. The received signal is amplified by the reception unit 203, frequency-converted (downconverted), and the components thereof in a desired band are extracted through the filtering process. The extracted signals are further converted into digital signals through an AD conversion, subjected to a process in physical layer such as demodulating, and thereafter input into the control unit 201.

If detecting the notification frame 51 on the basis of the input signals, the control unit 201 checks whether or not the terminal itself is specified as a target of channel estimation in the notification frame 51, by checking whether or not the identification information on the terminal itself is stored in any one of the terminal information fields. The control unit 201 can be configured to check whether or not the identification information on the terminal itself is stored in the common information field. If checking that the terminal itself is specified, the control unit 201 checks, as necessary, whether or not information (common information or individual information) on a method of transmitting the channel information frame stored in the notification frame 51 is stored in the common information field or the terminal information field, or in both fields. If the information is stored, the control unit 201 reads out the information on the method of transmitting from the field in question. If the read out information contains information to specify the preamble to use at the time of transmission of the channel information frame, the control unit 201 specifies the preamble to use on the basis of the information in question. Note that the control unit 201 may use the preamble to use given beforehand. If the terminal itself is specified in the notification frame, the control unit 201 expects for the channel estimation frame to be transmitted from the access point 11.

If detecting the channel estimation frame 52 on the basis of the signal input from the reception unit 203, the control unit 201 performs channel estimation on the basis of the frame 52 to obtain the channel information on the downlink. An example of the channel information includes the components or the like of the channel state information (channel response matrix) or of a V matrix obtained by decomposing the channel response matrix into single values. The control unit 201 generates a channel information frame containing the above-described preamble, the obtained channel information, and the like. The control unit 201 performs a control so as to transmit the generated channel information frame to the access point 11 after the lapse of the certain period of time from the reception of the channel estimation frame. The channel information frame is transmitted via the transmission unit 202 and the antenna 1A. The operation of the transmission unit 202 is as described above.

After transmitting the channel information frame, the control unit 201 expects the frame to be transmitted from the access point 11 by the downlink multiuser MIMO. If detecting the frame addressed to the terminal itself on the basis of the signal input from the reception unit 203, the control unit 201 stores the frame in the buffer 204 if the frame is a user data frame, or performs a required process based on the content of the frame in question if the frame is a control frame or a management frame. Note that the data frame, the control frame, and the management frame will be presented in detail in another embodiment to be described hereafter.

The control unit 201 may access a storage device that stores pieces of information to be transmitted to the access point 11, or pieces of information received from the access point 11, to read the pieces of information. The storage device may be either an internal memory or an external memory, and either a volatile memory or a non-volatile memory. Alternatively, the storage device may be an SSD, a hard disk, or the like instead of a memory.

The above-described manner of dividing processes into those performed by the control unit 201 and those performed by the transmission unit 202 is one example, and another manner of dividing can be employed. For example, the control unit 201 may perform processes within a digital domain, and the transmission unit 202 may perform processes subsequent to the DA conversion. With respect to the manner of dividing the processes into those performed by the control unit 201 and those performed by the reception unit 203, likewise, the reception unit 203 may perform processes up to the AD conversion, and the control unit 201 may perform processes within the digital domain subsequent thereto, including the process in the physical layer. A manner of dividing other than that described here may be employed.

Although the above-described embodiment illustrates the case where the access point 11 specifies the preambles to use to the wireless terminals, another form may be employed as a modification in which the wireless terminals each use a fixed preamble. In this case, the access point 11 just has to always specify a set of wireless terminals having orthogonal preambles when intending to perform the downlink multiuser MIMO transmission. In addition, if a variable spatial multiplexing number is allowed, the wireless terminals shall be configured to use fixed preambles in accordance with the spatial multiplexing number, and the access point 11 shall notify the information to specify the spatial multiplexing number to the wireless terminals.

Figure 11:
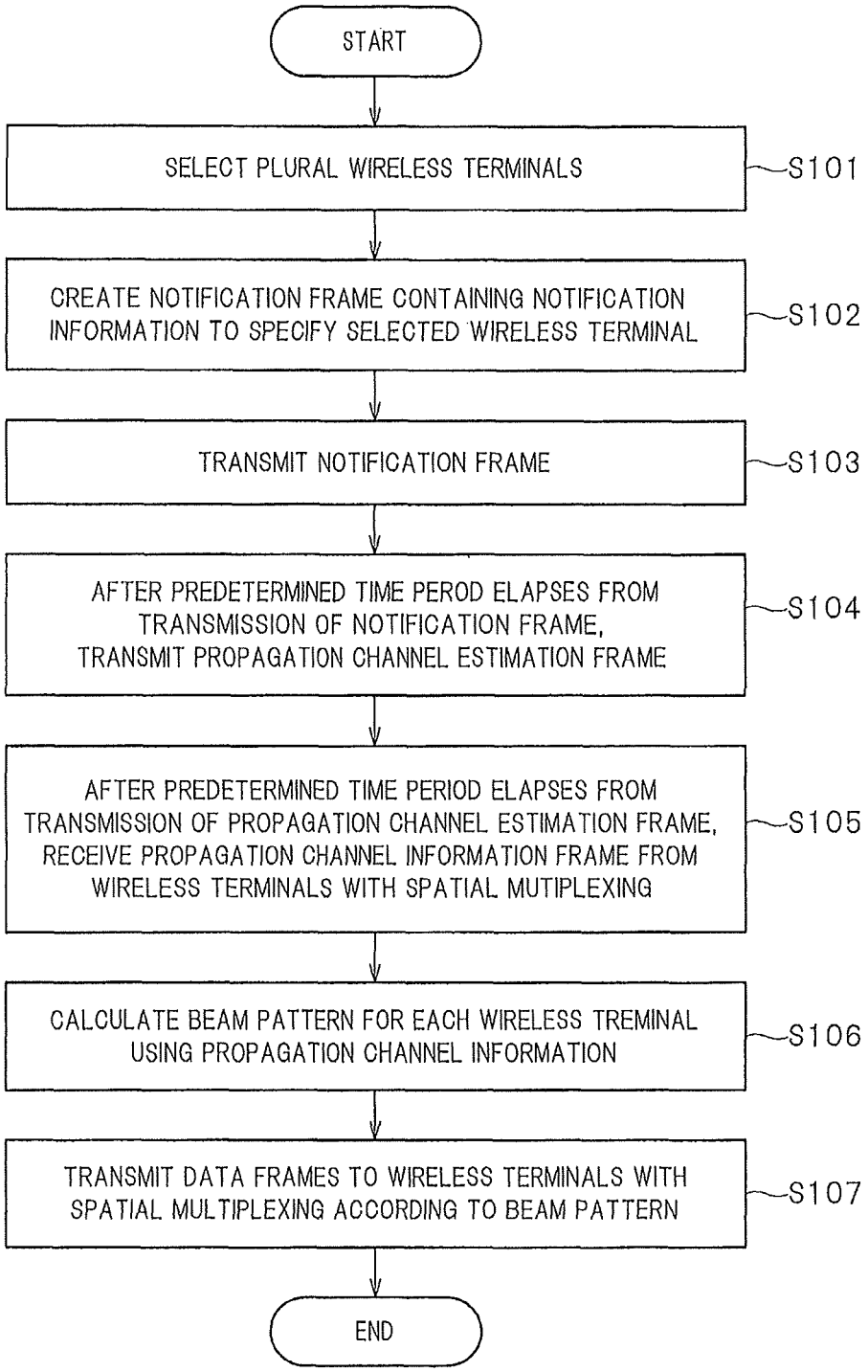
FIG. 11 is a flow chart of the operation of the access point according to the first embodiment.

FIG. 11 is a flow chart of the operation of the access point according to the first embodiment. The communication controlling device of the access point selects a plurality of wireless terminals (or a plurality of communication devices) to be a destination of the downlink multiuser MIMO transmission (S101), creates a notification frame containing notification information to specify the selected wireless terminal (first frame) (S102). After obtaining an access right for transmission, the communication controlling device of the access point transmits the notification frame via the wireless communication unit (S103). The notification frame may contain the notification information on a method of transmitting the propagation channel information frames by the plurality of wireless terminals. For example, the notification information contains information to specify preambles that the plurality of wireless devices dispose in the propagation channel information frames.

After a predetermined first time period (time period T1) elapses from the transmission of the notification frame, the communication controlling device of the access point transmits a propagation channel estimation frame (second frame) via the wireless communication unit (S104).

After a predetermined second time period (time period T2) elapses from the transmission of the propagation channel estimation frame, the communication controlling device of the access point receives propagation channel information frames (third frames), each of which contains propagation channel information estimated on the basis of propagation channel estimation frame, transmitted from respective wireless terminals of the plurality of wireless terminals with the spatial multiplexing, via the wireless communication unit (S105). The preambles of the propagation channel information frames received from the respective wireless terminals are orthogonal to one another.

The communication controlling device of the access point calculates the beam pattern for the downlink multiuser MIMO transmission for each wireless terminal, using the propagation channel information contained in the propagation channel information frame (S106). After a predetermined time period (time period T3) elapses from the reception of the propagation channel information frame, the communication controlling device of the access point transmits the Data Frame to the respective wireless terminals in conformity with the calculated beam pattern (S107).

Figure 12:
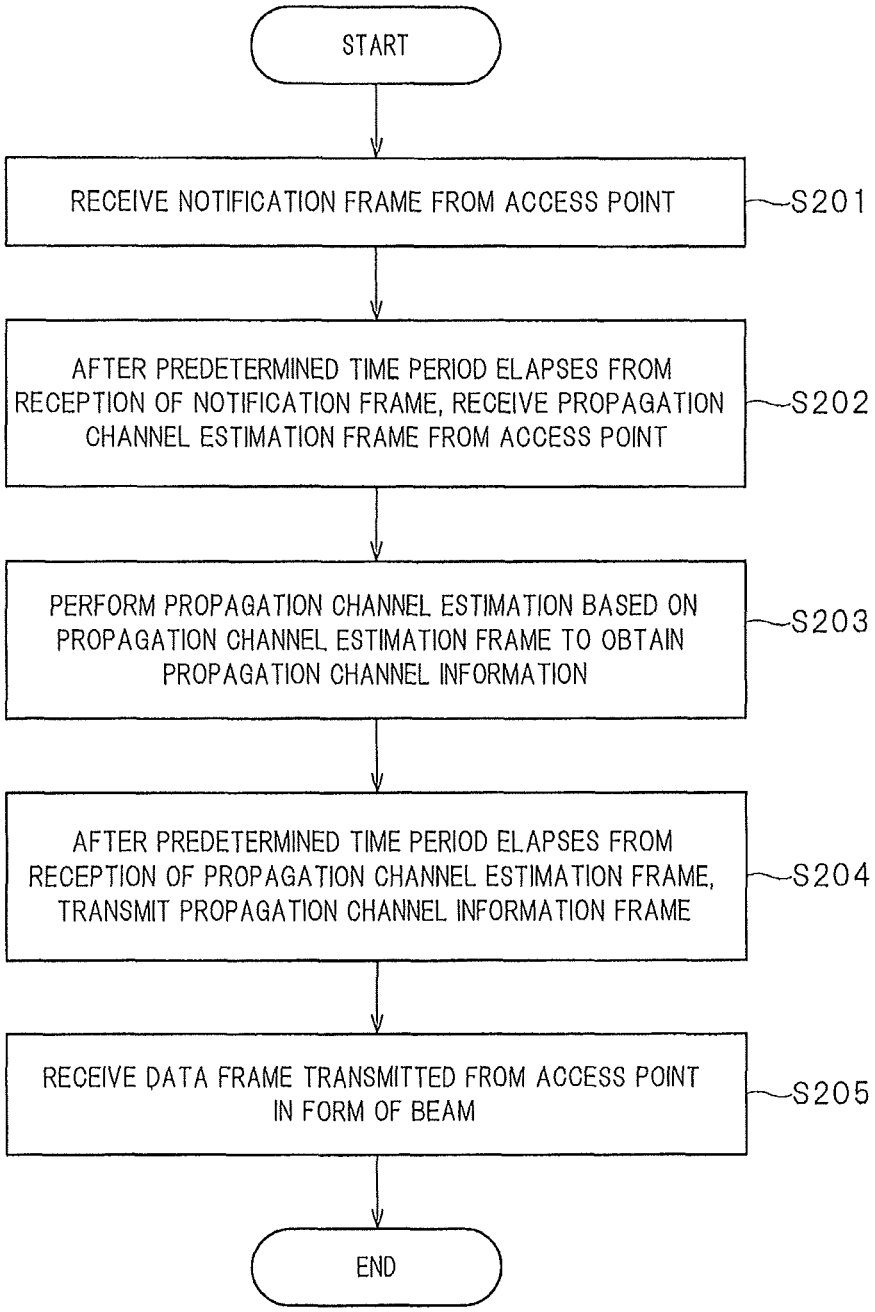
FIG. 12 is a flow chart of the operation of the wireless terminal according to the first embodiment.

FIG. 12 is a flow chart of the operation of the wireless terminal according to the first embodiment. The communication controlling device of the wireless terminal receives the notification frame (first frame), which is transmitted from the access point, containing the notification information to specify the plurality of wireless terminals including the own terminal, via the wireless communication unit (S201). The notification information may contain information on the transmission method for the propagation channel information frame.

After the predetermined first time period (time period T1) elapses from the reception of the notification frame, the communication controlling device of the wireless terminal receives the propagation channel estimation frame (second frame) transmitted from the access point, via the wireless communication unit (S202).

The communication controlling device of the wireless terminal performs the propagation channel estimation based on the propagation channel estimation frame to obtain the propagation channel information (S203). The communication controlling device of the wireless terminal then creates the propagation channel information frame (third frame) containing the propagation channel information, and after the predetermined second time period (time period T2) elapses from the reception of the propagation channel estimation frame, transmits the propagation channel information frame to the access point via the wireless communication unit (S204). The preambles that can be used in the propagation channel information frames transmitted by the wireless terminals are specified in advance so as to be orthogonal to one another. For example, the usable preamble is specified for each notification frame. In addition, the propagation channel information frames transmitted by the wireless terminals are transmitted with the same frequency band, and after the second time period elapses from the reception of the propagation channel estimation frames, the wireless terminals transmit the propagation channel information frames, which causes the propagation channel information frames to be transmitted from the wireless terminals to the access point with the spatial multiplexing (with the same frequency band and at the same time).

After a predetermined time period (T3) elapses from the transmission of the propagation channel information frame, the communication controlling device of the wireless terminal receives the Data Frame that is transmitted from the access point to the own terminal in the form of a beam (S205).

As described above, according to the first embodiment, the wireless terminals are caused to perform channel estimation at the same time, and the wireless terminals are caused to feed back the channel information frames at the same time. Consequently, the period of time from performing channel estimation until starting the downlink multiuser MIMO transmission by the wireless terminals can be shortened, which can prevent characteristic degradation at the time of the downlink multiuser MIMO transmission. In addition, since the wireless terminals feedback the channel information frames at the same time, a high-efficiency feedback and an increased system throughput can be achieved. An increased number of wireless terminals to perform simultaneously channel estimation further enhances this effect.

Second Embodiment

In the first embodiment, the wireless terminals that perform the uplink multiuser MIMO transmission each use one stream for the transmission. Likewise, the number of streams used for the downlink multiuser MIMO transmission from the access point to each wireless terminal is one. The present embodiment will describe an embodiment of the case where a wireless terminal can perform transmission or reception using two or more streams, that is, a wireless terminal that can perform transmission or reception in MIMO. The present embodiment will be described below in detail.

Figure 14:
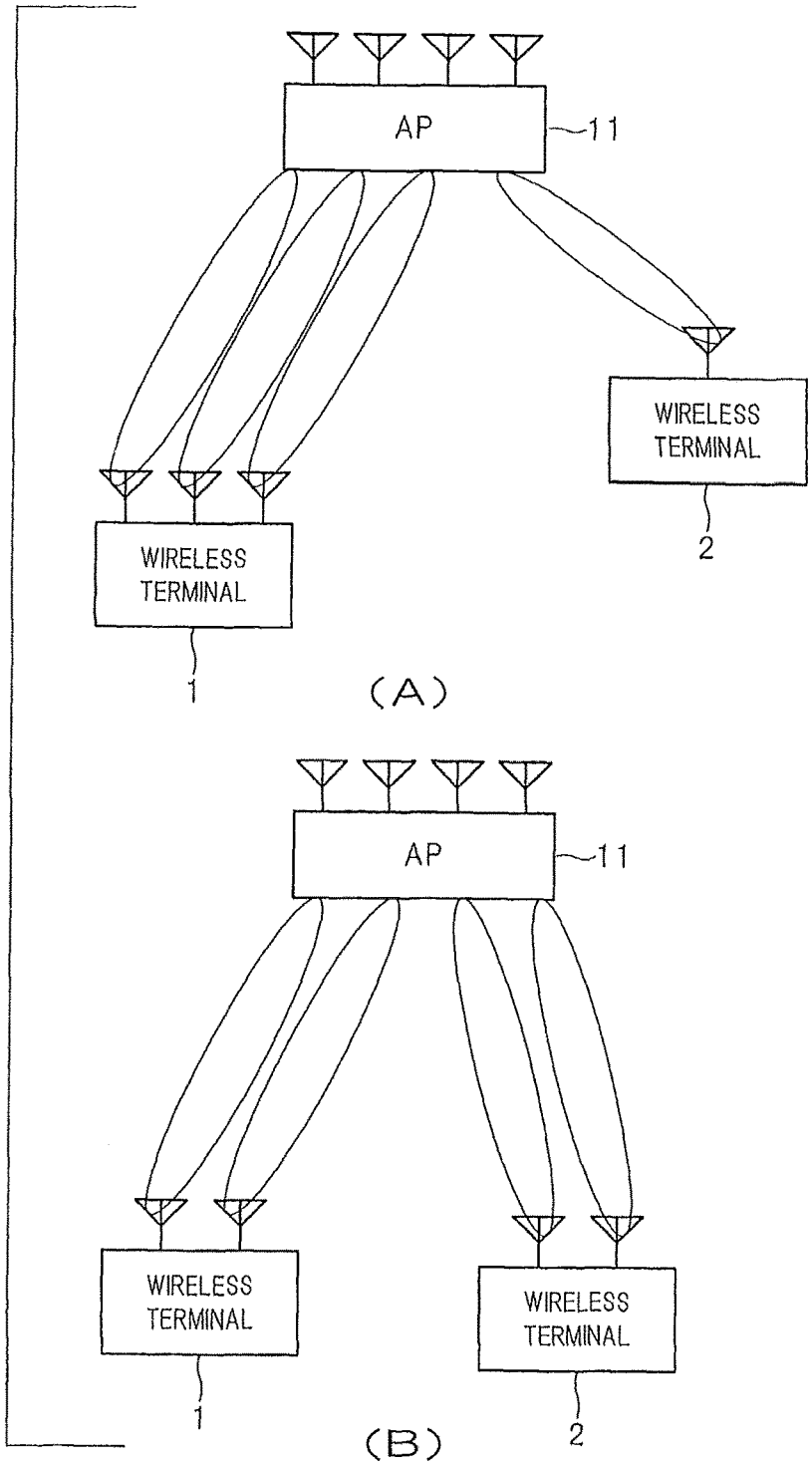
FIG. 14 is a diagram showing examples of a system including a wireless terminal that can perform MIMO transmission and reception.

FIG. 14(A) and FIG. 14(B) show examples of the system in which a wireless terminal can perform transmission and reception using two or more streams, that is, a wireless terminal that can perform transmission and reception in MIMO.

In the example of FIG. 14(A), a wireless terminal 1 includes three antennas, and a wireless terminal 2 includes one antenna. The wireless terminal 1 transmits three data streams in MIMO, and the wireless terminal 2 transmits one data stream. In FIG. 14(B), the wireless terminal 1 and the wireless terminal 2 each include two antennas, and each transmit two data streams in MIMO. In either case of FIG. 14(A) or FIG. 14(B), the total number of transmission streams is four as a whole, which allows for the uplink multiuser MIMO transmission using four streams or the downlink multiuser MIMO transmission using four streams. Note that the user multiplexing number is four in the example of FIG. 2, whereas the user multiplexing number is two in the examples of FIG. 14(A) and FIG. 14(B). Note that a block configuration of the wireless communication device installed in the MIMO-supported wireless terminal is similar to that shown in FIG. 9. The configuration and operation thereof will be omitted because they are obvious from the MIMO operation of the access point described thus far.

In the case where there is a wireless terminal that can perform transmission in MIMO like this, the control unit 101 of the access point 11 (explicitly or implicitly) uses the notification frame 51 to specify the total number of streams, and to specify the number of streams allowed to be transmitted to the wireless terminals. Furthermore, row numbers (or column numbers) of the orthogonal matrix can be specified to wireless terminals by the number of streams allowed to be transmitted with the terminal information field. Note that the control unit 101 of the access point 11 may obtain the number of streams that the wireless terminals can handle from the wireless terminals, for example, at the time of associating.

The control unit 101 of the access point 11 may specify the total number of transmission streams in the common information field. Alternatively, the explicit notification of the total number of transmission streams may be omitted because the wireless terminals can detect the total number of transmission streams by calculating the total number of row numbers (or column numbers) stored in the terminal information fields.

Alternatively, the specification of the number of allowed streams to the wireless terminal may be explicitly notified in the terminal information fields of the notification frame 51. Alternatively, since the number of the row numbers (or column numbers) in the orthogonal, matrix notified with the terminal information field is identical to the number of transmission streams to be allowed, the number of streams allowed to be transmitted may be implicitly notified to the wireless terminal with the number of the row numbers (or column numbers) in the orthogonal matrix. That is, in such case, the value of the number of streams does not need to be explicitly notified.

An example of implicitly notifying the number of streams will be described below. For example, let us consider the case where, as shown in FIG. 14(A), the total number of transmission streams used for the uplink multiuser MIMO transmission is four, the wireless terminal 1 uses three streams, and the wireless terminal 2 uses one stream.

The control unit 101 of the access point 11 sets the row numbers 1, 2, and 3 of the orthogonal matrix to the terminal information field corresponding to the wireless terminal 1. The wireless terminal 1 thereby detects that it is allowed the transmission of three streams. In addition, the wireless terminal 1 detects that it uses preambles based on the rows [1, −1, 1, 1], [1, 1, −1, 1], and [1, 1, 1, −1] of row numbers 1, 2, and 3 of the orthogonal matrix corresponding to the total number of transmission streams of four, for each stream. As described above, the control unit 101 of the access point 11 may notify the total number of transmission streams explicitly in the common information field, or may omit the notification.

Here, in the case of explicitly notifying the number of streams allowed to be transmitted with terminal information fields, a configuration may be employed in which the notification of the row numbers (or column numbers) of the orthogonal matrix is omitted. For example, suppose that the number of streams allowed to be transmitted for the wireless terminal corresponding to the terminal information field 1 is three, and the number of streams allowed to be transmitted for the wireless terminal corresponding to the terminal information field 2 is one. In this case, the wireless terminal corresponding to the terminal information field 1 uses the first to third rows in the orthogonal matrix, and the wireless terminal corresponding to the terminal information field 2 uses the fourth row therein. The wireless terminal sums up the numbers of streams allowed to be transmitted that are stored in the terminal information fields having field numbers smaller than that of the terminal itself, and adds one to the sum to calculate a start value of the row numbers (or column numbers) that the terminal itself uses. That is, by employing a scheme in which the rows or columns in the orthogonal matrix are allocated in an ascending order from the wireless terminals of smaller terminal information fields, it is possible to omit the notification of the row numbers (or column numbers) used by the wireless terminals.

Here, in the case where the number of transmission streams allowed to the wireless terminals is limited to a common value, the common number of transmission streams may be specified with the common information field in the notification frame 51, and the notification of the number of streams allowed to be transmitted with the terminal information fields may not need to be performed. Also in this case, the total number of transmission streams in the uplink multiuser MIMO may be explicitly notified in the common information field. Alternatively, the wireless terminals may detect the total number of transmission streams on the basis of the common number of transmission streams and the number of terminal information fields, instead of the explicit notification in the common information field.

As described above, according to the present embodiment, by specifying the numbers of transmission streams allowed to the wireless terminals directly or indirectly, the wireless terminals are allowed to use the MIMO transmission in combination. If the numbers of transmission streams to be allowed are not specified to the wireless terminals, the total number of the whole transmission streams transmitted in the uplink multiuser MIMO can outnumber the number of streams that the access point can separate. In addition, it is possible that the wireless terminals cannot select the preamble that does not overlap with those of the other wireless terminals. In the present embodiment, these problems can be solved by specifying the number of transmission streams to be allowed, to the wireless terminals.

Third Embodiment

In the first embodiment, the access point can estimate the channel response matrix of the uplinks with the preambles orthogonal to one another transmitted from the wireless terminal. In a third embodiment, the wireless terminals transmit the preambles using frequency carriers that are orthogonal to one another, which enables estimating the channel response matrix of the uplinks. The present embodiment works under the assumption of using a multicarrier modulation scheme, in particular, the OFDM (Orthogonal Frequency Division Multiplexing). Note that the above-described first or second embodiment can support both of the multicarrier modulation scheme and a single-carrier modulation scheme. The present embodiment will be described below in detail.

Figure 15:
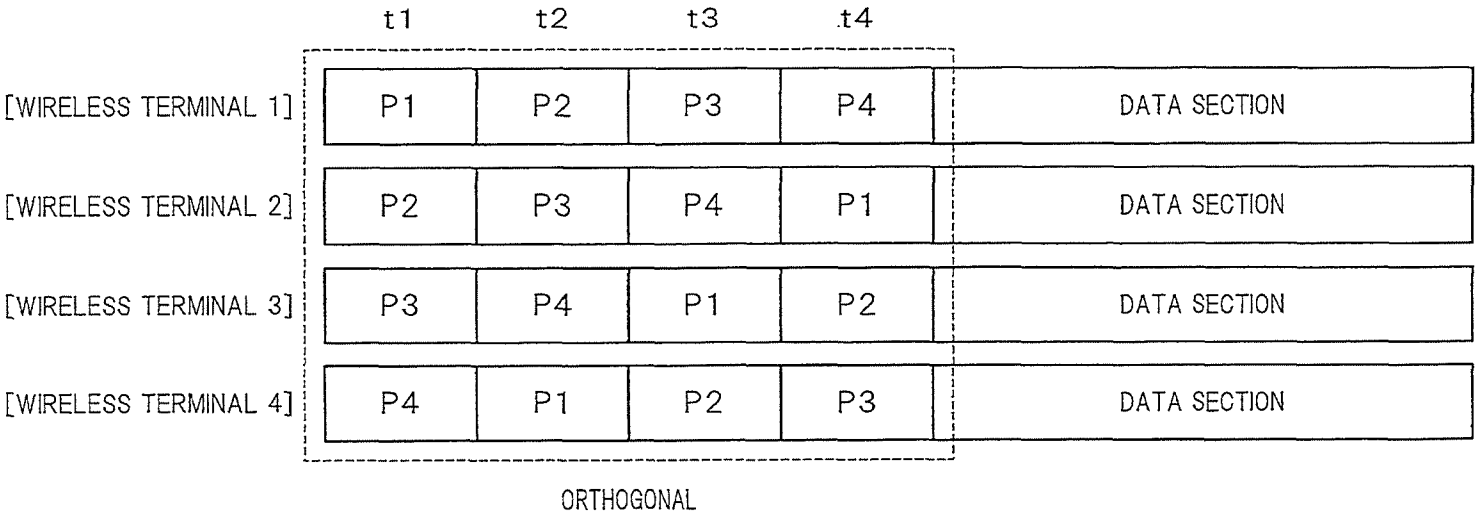
FIG. 15 is a diagram showing a schematic configuration example of channel information frames according to a third embodiment.

FIG. 15 shows a schematic configuration example of a channel information frame according to the third embodiment. The shown schematic configuration example is of the channel information frames transmitted by the wireless terminals 1 to 4. As with the first embodiment, each channel information frame contains the preamble section and the data section, but the configuration of each preamble section is different from that of the first embodiment.

The preamble section of each channel information frame is formed by a plurality of segments, and the individual segments contain carrier patterns P1, P2, P3, and P4 the order of which are different for each segment. One segment corresponds to one OFDM symbol period.

The carrier pattern P1 indicates that the preamble data is transmitted with subcarriers f1, f5, and f9 of OFDM modulation. The carrier pattern P2 indicates that the preamble data is transmitted with subcarriers f2, f6, and f10 of the OFDM modulation. The carrier pattern P3 indicates that the preamble data is transmitted with subcarriers f3, f7, and f11 of the OFDM modulation. The carrier pattern P4 indicates that the preamble data is transmitted with subcarriers f4, f8, and f12 of the OFDM modulation.

The preamble data transmitted with the subcarriers may be any data as long as it is known to the access point 11. The data may be the same for all the subcarriers, or the data may be different for each subcarrier.

To the segments, timings t1, t2, t3, and t4 are set in an order from left to right. The timings t1, t2, t3, and t4 represent transmission timings of the respective segments in the preamble section. The carrier patterns for the segments at the same timing are different for each wireless terminal. That is, at each of the timings t1, t2, t3, and t4, the subcarriers that the wireless terminals use for transmitting the preambles are orthogonal to one another in terms of frequency. That is, the subcarriers used by the wireless terminals do not interfere with one another. In the case of the OFDM, since the frequencies of the subcarriers are selected such that the subcarriers are orthogonal to one another, the subcarriers used by the wireless terminals do not interfere with one another as long as different subcarriers are used.

For example, at the timing t1, the subcarriers used by the wireless terminal 1 are f1, f5, and f9, the subcarriers used by the wireless terminal 2 are f2, f6, and f10, the subcarriers used by the wireless terminal 3 are f3, f7, and f11, and the subcarriers used by the wireless terminal 4 are f4, f8, and f12. Since the subcarriers do not overlap with subcarriers of the wireless terminals, the subcarriers are orthogonal among the wireless terminals. At the other timings t2 to t4, likewise, the subcarriers are orthogonal among the wireless terminal. Since P1 to P4 are allocated to the wireless terminals 1 to 4 in different orders, none of the subcarriers f1 to f12 interfere with other subcarriers of all the wireless terminals 1 to 4. Such a manner of switching the subcarriers for each segment, while different subcarriers are used among the wireless terminals for the same segment (at the same timing), may be called tone interleaving.

As a specific operation example, at the timing t1, the control unit 201 of the wireless terminal 1 allocates the preamble data to the subcarriers f1, f5, and f9, while allocating, for example, null data to the other subcarriers to generate and transmit the OFDM symbols. Likewise, the control unit 201 of the wireless terminal 2 allocates the preamble data to the subcarriers f2, f6, and f10, while allocating, for example, null data to the other subcarriers to generate and transmit the OFDM symbols. The control unit 201 of the wireless terminal 3 allocates the preamble data to the subcarriers f3, f7, and f11, while allocating, for example, null data to the other subcarriers to generate and transmit the OFDM symbols. The control unit 201 of the wireless terminal 4 allocates the preamble data to the subcarriers f4, f8, and f12, while allocating, for example, null data to the other subcarriers to generate and transmit the OFDM symbols.

The access point 11 receives the OFDM symbols at the same time from the wireless terminals 1 to 4 through the antennas. The reception unit 103 or the control unit 101 of the access point 11 can obtain the signal of each subcarrier by demodulating the signal received by each antenna. Specifically, with respect to the timing t1, the signals of the subcarriers f1, f5, and f9 can be obtained for the wireless terminal 1, the signals of the subcarriers f2, f6, and f10 can be obtained for the wireless terminal 2, the signals of the subcarriers f3, f7, and f11 can be obtained for the wireless terminal 3, and the signals of the subcarriers f4, f8, and f12 can be obtained for the wireless terminal 4. With respect to the other timings t2 to t4, likewise, each wireless terminal consecutively generates and transmits the OFDM symbol on the basis of the different carrier patterns. The control unit 101 of the access point 11 can thereby obtain the signals of all the frequency subcarriers f1 to f12 for the wireless terminals 1 to 4, which allows for the correct estimation of the channel response matrix of the uplinks.

To transmit the preamble with the subcarriers mutually orthogonal to other subcarriers of the wireless terminals, information on the order of the carrier patterns used and the preambles used for the respective carriers needs to be notified to the wireless terminals.

As a method of notification, as with the first embodiment, the control unit 101 of the access point 11 can make use of the common information field or the terminal information field, or both the fields in the notification frame 51 to notify the information on the order of the carrier patterns for each wireless terminal and the preamble for the respective subcarriers. Note that if the preambles are the same and fixed for all the wireless terminals and all the subcarriers, the notification may be omitted.

As a specific example of notification, information representing the correspondence between the subcarrier number and the preamble data to be allocated to the subcarrier may be notified in the common information field for each of the carrier patterns P1 to P4. Alternatively, information on the order of P1 to P4 may be notified in the terminal information fields of the respective wireless terminals.

The method of notification can be expanded or modified in various forms based on the same principle as the first embodiment. For example, besides the method of the explicit notification in the common information field and in the terminal information fields, implicit notification can be provided making use of the number of terminal information fields, the total number of transmission streams, or the like. Furthermore, the present embodiment has been described as an expansion of the first embodiment, the second embodiment can also be similarly expanded and implemented.

Note that, although the subcarriers f1 to f12 are used for transmitting the preambles, this is merely one example, and more or less subcarriers may be used for transmitting the preambles. In addition, the subcarriers to transmit the data section may be the same subcarriers that have been used for transmitting the preambles, or may be subcarriers different therefrom. In the case of using different subcarriers, the access point 11 may predict and calculate the channel responses of the subcarriers for the data sections from channel responses of the subcarriers for transmitting the preambles, using any method. For example, channel responses of subcarriers nearest among the subcarriers for transmitting the preambles which are nearest in terms of frequency may be employed for each of the subcarriers for the data sections.

Alternatively, transmitting preamble patterns at different timings by the wireless terminals, that is, transmitting the preamble patterns in a time orthogonal manner by the wireless terminals enables the estimation of the propagation channel response matrix of the uplink.

Figure 13:
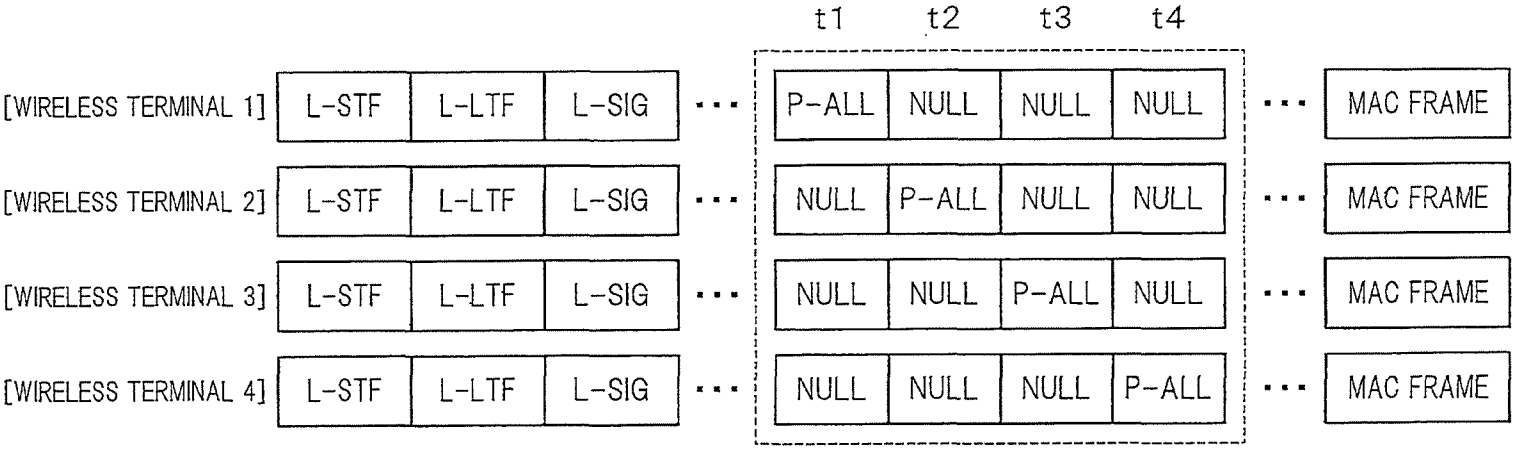
FIG. 13 is a diagram showing a schematic configuration example of the propagation channel information frame in the case where preamble patterns are transmitted at different timings.

FIG. 13 shows a schematic configuration example of propagation channel information frames in the case where the preamble patterns are transmitted at different timings. A carrier pattern "P-ALL" means that the preamble patterns are transmitted using all the subcarriers f1 to f12 in OFDM modulation, "NULL" means that no preamble pattern is transmitted. The preamble patterns may be any patterns as long as they are known by the access point 11. By transmitting the preamble patterns by the wireless terminal 1 at a timing t1, by the wireless terminal 2 at t2, by the wireless terminal 3 at t3, and by the wireless terminal 4 at t4, the preamble patterns can be transmitted in the time orthogonal manner. In the case of such a time orthogonal manner, since the wireless terminals transmit the preamble patterns consecutively, only one of the wireless terminals transmits the preamble pattern at some point in time. That is, the transmission timings of the preamble patterns by the wireless terminals do not overlap with one another.

The access point 11 receives the preamble pattern from the wireless terminal 1 at the timing t1, from the wireless terminal 2 at t2, from the wireless terminal 3 at t3, from the wireless terminal 4 at t4. This allows the control unit 101 of the access point 11 to obtain the signals of all the frequency subcarriers f1 to f12 with respect to the wireless terminals 1 to 4, and to estimate the propagation channel response matrix of the uplink.

As seen from the above, to cause the wireless terminals to transmit the preamble patterns at the different timings, the information such as the transmission timings and the preamble patterns for the wireless terminals (spatial separation information) needs to be notified to the wireless terminals.

As a method of the notification, as with the first embodiment, the control unit 101 of the access point 11 may notify the spatial separation information using the common information field or the terminal information field or both of them in the notification frame 51.

As described above, according to the present embodiment, the wireless terminal transmits the preambles with the frequency carriers orthogonal to one another, which allows the access point 11 to correctly estimate the channel response matrix of the uplinks even if receiving the preambles at the same time from the wireless terminals. In addition, shifting the timings to transmit the preamble patterns by the wireless terminals enables the access point 11 to estimate the propagation channel response matrix of the uplinks.

Fourth Embodiment

In the present embodiment, the access point adjusts reception timings at which the wireless terminals transmit the channel information frames in the uplink multiuser MIMO.

As described in the first embodiment, the wireless terminals transmit the channel information frames after the lapse of the certain period of time (refer to T2 of FIG. 2) from receiving the channel estimation frame 52. If distances between the access point and the wireless terminals are identical, the access point basically receives the channel information frames transmitted from the wireless terminals at the same timing.

However, the differences in distances between the access point and the wireless terminals result in differences in propagation times thereof, and therefore the longer a distance between the wireless terminal and the access point is, the greater a delay of the timing at which the channel estimation frame 52 is received from the access point. In addition, the longer the distance between the wireless terminal from the access point, the greater a delay of the timing at which the access point receives the channel information frames that the wireless terminals receive after the lapse of the certain period of time from the reception of the channel estimation frame 52.

For this reason, when a maximum delay time difference between the access point and the wireless terminals in one direction is denoted by $\Delta t$, a time difference of up to $2\times\Delta t$ occurs with respect to the timing at which the access point receives the channel information frames from the wireless terminals. The time difference of $2\times\Delta t$ within a guard interval of the OFDM or the like (it may be called a cyclic prefix) presents no problem. Note that the cyclic prefix can be used in a multicarrier modulation scheme other than the OFDM, or in a single-carrier modulation scheme, and the present embodiment is not limited to the OFDM.

However, the channel information frames received from the wireless terminal with delay time differences exceeding the guard interval result in characteristic degradation of the uplink multiuser MIMO transmission.

Thus, in a fourth embodiment, the reception timings of the channel information frames at the access point are adjusted. Specifically, the transmission timings of the channel information frames at the wireless terminals are adjusted. The characteristic degradation of the uplink multiuser MIMO transmission due to delay time differences between the access point and the wireless terminals can be thereby prevented.

The control unit 101 of the access point 11 according to the present embodiment communicates in advance with the wireless terminals to estimate the delay times with respect to the wireless terminals, before transmitting the notification frame (refer to reference numeral 51 of FIG. 2). The method of the estimation may be any method, and various existing known arts can be used. For example, the access point 11 transmits a measurement frame, and the wireless terminals return frames each containing a reception time of the measurement frame. The control unit 101 of the access point 11 measures delay times from a difference between a point in time of transmitting the measurement frame and the reception time stored in the returned frame. As another example, the access point 11 transmits a measurement frame, receives response frames from the wireless terminals, and measures a delay time from a difference between a point in time of transmitting the measurement frame and a point in time of receiving the response frames. Various methods other than those described here can be used.

As with the first embodiment, the control unit 101 of the access point 11 specifies the wireless terminals being targets of channel estimation in the terminal information fields of the notification frame 51. The control unit 101 of the access point 11 of the fourth embodiment specifies therewith the amounts of time adjustment used for adjusting the timings at which the wireless terminals transmit the channel information frames, in the terminal information fields. The control unit 201 of each wireless terminal moves up or puts off a transmission timing of the channel information frame with respect to a reference timing on the basis of the amount of time adjustment notified in the terminal information field, upon receiving the notification frame 51 from the access point 11 and detecting that it has been specified as a target of channel estimation. The reference timing is, for example, a timing after the lapse of the certain period of time (refer to reference character T2 of FIG. 1) from the reception of the channel estimation frame. The wireless terminals transmit the channel information frames at the adjusted transmission timings.

Here, the amounts of time adjustment of the wireless terminal set by the access point 11 are determined such that the timings of the reception of the channel information frames from the wireless terminals fall within a certain range of time delay. The certain range of time delay is set within the guard interval to set such amounts of time adjustment, the delay times estimated in advance with respect to each wireless terminal are used.

The amounts of time adjustment of the wireless terminals may be set using a relative time from the transmission timing of a reference wireless terminal. Here, with respect to the reference wireless terminal a certain timing (e.g., after the lapse of the certain period of time from the reception of the channel estimation frame) can be set as the transmission timing. The wireless terminals other than the reference wireless terminal transmit the channel information frames at the timings shifted only by the relative time from the transmission timing of the reference wireless terminal.

Here, the reference wireless terminal may be specified through any method. For example, the common information field may contain the specification of the reference wireless terminal. Alternatively, the wireless terminal specified in a terminal information field having a predetermined number, such as the terminal information field 1, may be set as the reference wireless terminal.

As described above, according to the present embodiment, the access point 11 controls the transmission timing of the channel information frame for individual wireless terminals, which allows the timings of the reception of the channel information frames from the wireless terminals to be within a certain range (such as the guard interval) regardless of communication delay times between the access point 11 and the wireless terminals.

Fifth Embodiment

The present embodiment has a feature in that the dynamic range of received powers with which the access point receives the channel information frames from the wireless terminals is within a certain range.

As described in the embodiments thus far, the access point 11 receives the channel information frames from the wireless terminals at the same time with the uplink multiuser MIMO. At this point, if the distances between the access point 11 and the wireless terminals are different from one another, the channel information frames are received with the received powers, different from one another due to the difference between attenuation level of signals, even if transmission powers of the wireless terminals are identical.

Figure 16:
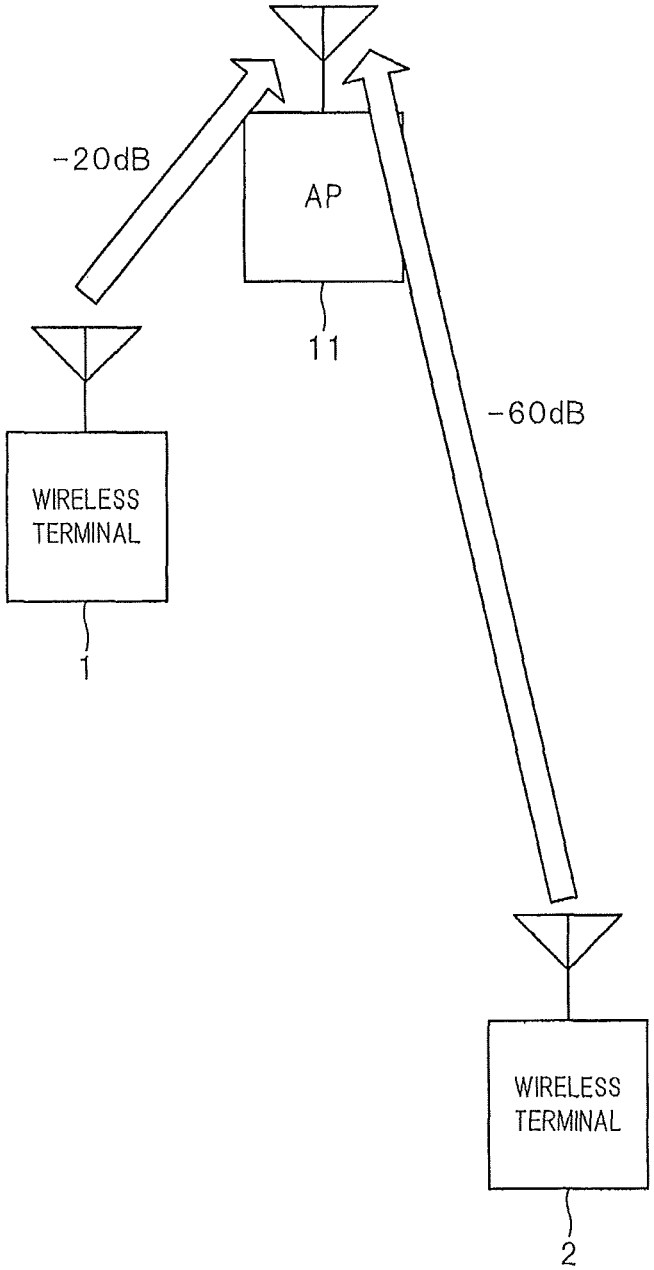
FIG. 16 is a diagram showing a situation where the wireless terminals are disposed at a near position and at a far position with respect to the access point.

FIG. 16 shows a situation where the wireless terminals 1 and 2 are disposed at a near position and at a far position with respect to the access point 11. In this example, the amount of distance attenuation from the wireless terminal 1 in the proximity of the access point 11 is 20 dB, and the amount of distance attenuation of the wireless terminal 2 disposed at the far position from the access point 11 is 60 dB. In this case, the access point 11 receives the channel information frames at the same time, the difference between the received powers being 40 dB.

When an input dynamic range, which is a ratio or a difference between a maximum value and a minimum value of the received powers, increases, the frame of the smaller received power is buried in quantization noise in the AD conversion, which may prevent the frame from being properly received. To handle a large input dynamic range, an AD converter having a large quantization bit rate may be adopted, but the quantization bit rate has a limitation, and such an AD converter raises costs.

Thus, in the fifth embodiment, the above-described problem is solved by performing a control such that the dynamic range of the received powers of the channel information frames received from the wireless terminals is within a certain range.

First, the control unit 101 of the access point 11 communicates in advance with the wireless terminals to estimate the amount of distance attenuation with respect to the wireless terminals, before transmitting the notification frame 51. The method of the estimation may be any method, and various existing known arts can be used. For example, the control unit 101 of the access point 11 instructs the wireless terminals to transmit a frame with a specified transmission power, and estimates the amounts of distance attenuation (the amount of distance attenuation of the uplinks) from the received power value of the frames and the specified transmission power. Alternatively, the access point 11 transmits a measurement frame with a certain transmission power, and the wireless terminals return frames each containing a received power value of the measurement frame. The control unit 101 of the access point 11 estimates the amount of distance attenuation (the amounts of distance attenuation of the downlinks) on the basis of the transmission power value of the measurement frame and the received power values stored in the returned frames. For the purpose of the present embodiment, it is preferable to calculate the amounts of distance attenuation of the uplinks, but in an environment where there is no large difference between the amounts of distance attenuation of the downlink and the uplink, any one of the amounts of distance attenuation may be calculated.

The control unit 101 of the access point 11 determines the transmission powers of the wireless terminals such that the reception dynamic range of the channel information frames transmitted from the wireless terminals being the targets of channel estimation is within a certain range, on the basis of the amounts of distance attenuation with respect to the wireless terminals. The dynamic range within the certain range is within the dynamic range that can be handled with the quantization bit rate of the AD converter installed in the access point 11.

The control unit 101 of the access point 11 specifies the wireless terminals to be the targets of channel estimation in the terminal information fields of the notification frame (refer to reference numeral 51 of FIG. 2), and sets the information on the transmission power that has been determined for the wireless terminals (transmission power information). The transmission power information may be actually represented by values of the transmission power with which the wireless terminals should perform the transmission, or may be represented by a relative value with respect to a transmission power (normal transmission power) used in normal transmission.

In the above description, the transmission powers of the wireless terminals are determined by the access point 11, but a configuration may be employed in which the wireless terminals determine the transmission powers thereof. An example of such configuration will be described below.

As a first example, the control unit 101 of the access point 11, the amounts of distance attenuation estimated for the wireless terminals are notified to the wireless terminals in the terminal information fields of the notification frame 51. The control unit 201 of each wireless terminal determines the transmission power of the channel information frame in accordance with the amount of distance attenuation notified in the terminal information field. For example, the transmission powers are determined such that the received powers of the channel information frames at the access point 11 are made to be a specified value or within a specified range. In this case, a value or a range of the received power expected by the access point 11 may be notified in the common information field of the notification frame 51. If the value or the range of the received power expected by the access point 11 is predetermined, the notification may be omitted.

As a second example, the control unit 101 of the access point 11 sets the value of the transmission power for the notification frame 51 and the value of the power of the channel information frames received from the wireless terminals expected by the access point 11 (expected received power value), to the common information field in the notification frame 51. The control unit 101 of the access point 11 transmits the notification frame 51, set in such a manner, with the value of the transmission power set in the common information field. Note that, if the value of the transmission power of the notification frame 51 or the expected received power of the channel information frame is a predetermined fixed value, the control unit 101 of the access point 11 may omit the notification of these values.

The control unit 201 of each wireless terminal that has received the notification frame 51 from the access point 11 measures the received power of the notification frame 51. The control unit 201 of each wireless terminal detects the amount of distance attenuation from the access point 11 to the wireless terminal on the basis of the measured value of the received power and the value of the transmission power notified in the common information field.

The control unit 201 of each wireless terminal determines the transmission power of the channel information frame such that the value of the received power of the channel information frame equals the expected received power value notified with the notification frame 51 at the access point 11, on the basis of the detected amount of distance attenuation. The control unit 201 of each wireless terminal performs a control so as to transmit the channel information frame with the determined transmission power. Note that, although the amount of distance attenuation of the downlink from the access point 11 to the wireless terminal and the amount of distance attenuation of the uplink from the wireless terminal to the access point 11 are not necessarily strictly identical depending on communication environment, such a method can be used in an environment in which they are considered to be substantially identical. Alternatively, the amount of distance attenuation of the uplink can be estimated by adjusting the amount of distance attenuation of the downlink by multiplying a coefficient thereto by any manner.

As described above, according to the present embodiment, the access point controls the transmission power with which the wireless terminals transmits the channel information frames, which allows for the channel information frames transmitted from the wireless terminals to be received at the same time in such a manner that the values of the received powers are within the certain dynamic range at the access point.

Sixth Embodiment

The present embodiment considers the case of performing OFDM transmission between the access point and the wireless terminal. In the OFDM transmission, it is necessary to maintain orthogonality between subcarriers in order to prevent interference between subcarriers. To maintain orthogonality between subcarriers, an accurate frequency synchronization is required between a transmission-side apparatus and a reception-side apparatus, but frequency offset can occur in a subcarrier group between the transmission apparatus and the reception apparatus, due to deviations of oscillatory frequencies or the Doppler shift. This has an impact on worsening the characteristics of the OFDM transmission.

In particular, in the case of the uplink multiuser MIMO transmission, the access point receives frames at the same time from a plurality of wireless terminals. The access point may therefore receive, for each wireless terminal, frames having different frequency offsets, at the same time. In this case, the frequency offsets more likely lead to characteristics degradation, as compared with a normal transmission (transmission of a single data stream).

Thus, a sixth embodiment is intended to reduce the characteristic degradation in the uplink multiuser MIMO transmission, through a control performed by the access point such that the frequency offsets in the subcarriers of the wireless terminals are within a certain range with respect to used frequencies (reference frequencies) of the subcarriers.

First, the control unit 101 of the access point 11 communicates in advance with the wireless terminals being the targets of channel estimation to estimate the amounts of frequency offset of the subcarriers thereof, before transmitting the notification frame 51. The method of estimation may by any method, and various existing known arts can be used. For example, the access point 11 transmits a subcarrier group of the used frequency to the wireless terminals, and the wireless terminals return frames storing reception frequencies of the subcarriers. The control unit 101 of the access point 11 compares the transmission frequency and the reception frequencies written in the returned frames to estimate the amounts of frequency offset in the subcarriers. Alternatively, the access point 11 instructs the wireless terminals to transmit a subcarrier group of the used frequency, and the control unit 101 of the access point 11 estimates the amounts of frequency offset of the subcarriers through comparison of the frequencies of the subcarrier group received from the wireless terminals with the used frequency. If the frequency offset of the subcarriers can be considered to be identical or within a certain range, the amount of offset of a center frequency of the OFDM signal (a center frequency of a channel bandwidth) may be estimated instead of calculating the frequency offset for each subcarrier.

The control unit 101 of the access point 11 determines the amounts of frequency correction for the wireless terminals on the basis of the amounts of frequency offset of the subcarriers estimated for the wireless terminals. The amounts of frequency correction are determined such that the frequency offset of the subcarriers at the time when the access point 11 receives the pieces of channel information from the wireless terminals are identical or within a certain range with respect to the respective used frequencies. The used frequencies may be fixedly set in advance in the access point 11 and in the wireless terminals, or a configuration can be employed in which the access point 11 determines the used frequencies and notifies them to the wireless terminals.

The control unit 101 of the access point 11 specifies the wireless terminals to be the targets of channel estimation in the terminal information field of the notification frame 51, and specifies pieces of information on the amounts of frequency correction of the subcarriers that have been determined for the wireless terminals (frequency correction information).

The frequency correction information may be represented by an absolute amount of correction indicating how much the frequency is shifted, or may be represented by a relative amount of correction indicating how much the frequency is shifted with respect to the value of the frequency of the reference wireless terminal.

If the frequency correction information is the absolute amount of correction, the control unit 201 of each wireless terminal performs a control so as to shift the frequencies of the subcarrier group by the specified amounts of correction. The channel information frame is generated through modulation based on the shifted subcarrier group.

If the frequency correction information is the relative amount of correction with respect to the reference wireless terminal, the control unit 201 of the wireless terminals other than the reference wireless terminal performs a control so as to shift the frequencies thereof with respect to the shifted frequency of the reference wireless terminal by the relative amount of correction. The channel information frames are generated through modulation based on the shifted subcarriers. Note that the absolute amount of correction is specified for the reference wireless terminal. The wireless terminals other than the reference wireless terminal can detect the shifted frequency of the reference wireless terminal on the basis of the absolute amount of correction of the reference wireless terminal.

Here, the reference wireless terminal may be shifted by any method. For example, the common information field may contain the specification of the reference wireless terminal. Alternatively, the wireless terminal specified in a terminal information field having a predetermined number, such as the terminal information field 1, may be specified as the reference wireless terminal.

Although the above description illustrates the case where the frequencies are adjusted from one subcarrier to another, if the offset of the subcarriers can be considered to be identical or within a certain range, the frequencies may be corrected by the same amount as a whole. In this case, the control unit 101 of the access point 11 does not calculate in advance the frequency offset for each subcarrier, but may determine the amount of correction on the basis of deviation between the center frequency (center frequency of the channel bandwidth) of the received OFDM signal and the reference center frequency. The wireless terminals may shift the whole subcarrier group by the same amount of frequency so as to shift the center frequency of the channel bandwidth.

Seventh Embodiment

Figure 17:
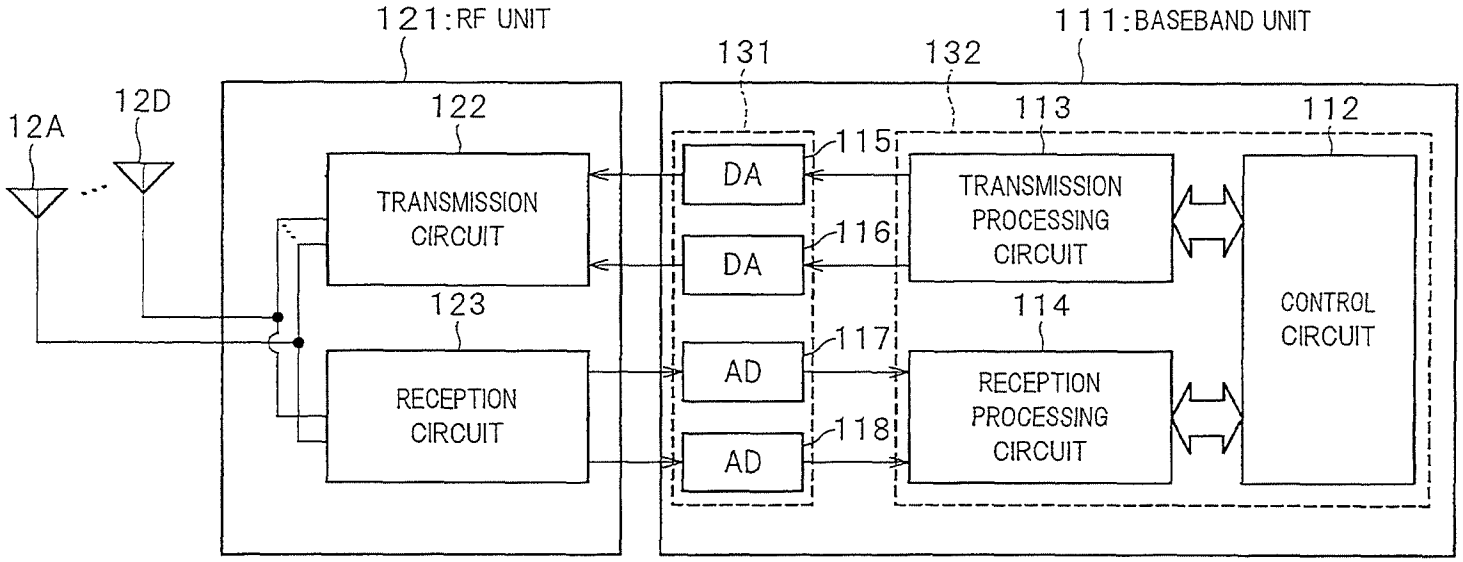
FIG. 17 is a diagram showing a hardware configuration example of a wireless communication device installed in an access point according to a seventh embodiment.

FIG. 17 shows a hardware configuration example of a wireless communication device installed in the access point according to a seventh embodiment. This configuration example is merely one example, and the present embodiment is not limited thereto. Since the basic operations thereof are the same as those of the wireless communication device shown in FIG. 9, the description will be focused on differences between the configurations, and redundant descriptions will be omitted.

This wireless communication device includes a baseband unit 111, a RF unit 121, and antennas 12A to 12D.

The baseband unit 111 includes a control circuit (protocol stack) 112, a transmission processing circuit 113, a reception processing circuit 114, DA conversion circuits 115 and 116, and AD conversion circuits 117 and 118. The RF unit 121 and the baseband unit 111 may be configured by one IC chip (Integrated Circuit).

The baseband unit 111 is, as one example, a baseband LSI or a baseband IC. Alternatively, as another example, the baseband unit 111 may include an IC 132 and an IC 131. At this point, the IC 132 may include the control circuit 112, the transmission processing circuit 113, and the reception processing circuit 114, and the IC 131 may include the DA conversion circuits 115 and 116, and the AD conversion circuits 117 and 118.

The control circuit 112 corresponds, as one example, to a communication controlling device for controlling communication, or a control unit for controlling communication. At this point, the wireless communication unit may include the transmission processing circuit 113 and the reception processing circuit 114. The wireless communication unit may further include the DAs 115 and 116, and the ADs 117 and 118, in addition to the transmission processing circuit 113 and the reception processing circuit 114. The wireless communication unit may even further include a transmission circuit 122 and a reception circuit 123, in addition to the transmission processing circuit 113, the reception processing circuit 114, the DAs 115 and 116, and the ADs 117 and 118. The integrated circuit according to the present embodiment may include a processor that performs all or a part of the process of the baseband unit 111, that is, all or a part of the processes of the control circuit 112, the transmission processing circuit 113, the reception processing circuit 114, the DAs 115 and 116, and the ADs 117 and 118.

Alternatively, the IC 132 may correspond to the communication controlling device for controlling communication. At this point, the wireless communication unit may include the transmission circuit 122 and the reception circuit 123. The wireless communication unit may further include the DAs 115 and 116, and the ADs 117 and 118, in addition to the transmission circuit 122 and the reception circuit 123.

The control circuit 112 in the baseband unit 111 includes the buffer 104 of FIG. 9, and performs processes in the MAC layer and the like. The control circuit 112 may include the clock generation unit. The transmission processing circuit 113 performs a desired process in the physical layer such as a modulation process or an addition of a physical header, and creates, for example, two kinds of digital baseband signals (hereafter, referred to as a digital I signal and a digital Q signal). In the case of the MIMO transmission, the two kinds of digital baseband signals are created for each stream. The DA converting circuits 115 and 116 subject signals input from the transmission processing circuit 113 to the DA conversion. More specifically, the DA converting circuit 115 converts the digital I signal into an analog I signal, and the DA converting circuit 116 converts the digital Q signal into an analog Q signal. Note that the analog signals may be transmitted with a single-channel signal without the quadrature modulation. In this case, the number of the DA converting circuits may be one. In addition, in the case where one or more channels of transmission signals are transmitted being distributed to a plurality of antennas, DA converting circuits corresponding in number to the antennas may be provided.

The RF unit 121 is, as one example, an RF analog IC or an RF IC. The transmission circuit 122 in the RF unit 121 includes a transmission filter for extracting a signal in a desired band from the signal of the DA-converted frame, a mixer for upconverting the filtered signal into that of a radio frequency by making use of a signal of a certain frequency supplied from an oscillator, a preamplifier (PA) for amplifying the upconverted signal, and the like.

The reception circuit 123 in the RF unit 121 includes an LNA (Low Noise Amplifier) for amplifying the signals received by the antennas, a mixer for downconverting the amplified signals to the baseband by making use of a signal of a certain frequency supplied from an oscillator, a reception filter for extracting signals in a desired band from the downconverted signals, and the like. More specifically, the reception circuit 123 subjects the received signals that are subjected to low-noise amplification by a low noise amplifier (not shown) to quadrature demodulation with carriers the phase difference between which is 90° to create the I (In-phase) signal being in phase with the received signal, and a Q (Quad-phase) signal with a phase delayed by 90° from the I signal. These I signal and Q signal are adjusted in gain and output from the reception circuit 123.

The AD conversion circuits 117 and 118 in the baseband unit 111 perform AD conversion to the input signals from the reception circuit 123. More specifically, the AD converting circuit 117 converts an I signal into a digital I signal, and the AD converting circuit 118 converts a Q signal into a digital Q signal. Note that the analog signals may be received with a single-channel signal without the quadrature modulation. In this case, the number of the AD converting circuits may be one. In addition, in the case where a plurality of antennas are provided, AD converting circuits corresponding in number to the antennas may be provided. The reception processing circuit 114 processes the physical layer, processes a demodulation and the like. The control circuit 112 processes the MAC layer and the like to the demodulated frames. In addition, the control circuit 112 performs a process relating to the MIMO. For example, a process of channel estimation, a transmission weight calculation process, a separating process of streams, and the like are performed.

Note that a switch for switching the antennas 12A to 12D to any one of the transmission circuit 122 and the reception circuit 123 may be disposed in the RF unit. By the switching control, the antennas 12A to 12D are connected to the transmission circuit 122 in transmitting, and the antennas 12A to 12D are connected to the reception circuit 123 in receiving.

The detailed description of the process of the above-described components is obvious from the description of FIG. 9, and therefore redundant descriptions will be omitted.

Figure 18:
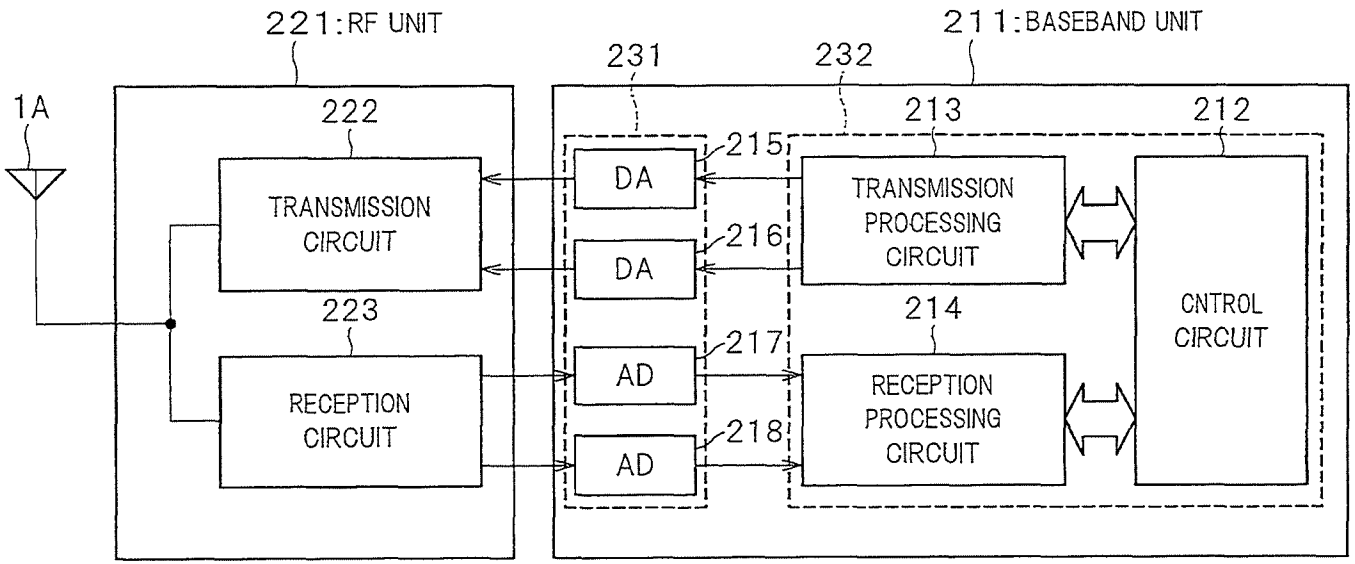
FIG. 18 is a diagram showing a hardware configuration example of a wireless communication device installed in a wireless terminal according to the seventh embodiment.

FIG. 18 shows a hardware configuration example of a wireless communication device installed in the wireless terminal according to the seventh embodiment. This configuration example is merely one example, and the present embodiment is not limited thereto. Since the basic operations thereof are the same as those of the wireless communication device shown in FIG. 10, the description will be focused on differences between the configurations, and redundant descriptions will be omitted.

This wireless communication device includes a baseband unit 211, an RF unit 221, and an antenna 1A. The RF unit 221 and the baseband unit 211 may be configured by one IC chip.

The baseband unit 211 includes a control circuit (protocol stack) 212, a transmission processing circuit 213, a reception processing circuit 214, DA conversion circuits 215 and 216, and AD conversion circuits 217 and 218.

The baseband unit 211 is, as one example, a baseband LSI or a baseband IC. Alternatively, as another example, the baseband unit 211 may include an IC 232 and an IC 231. At this point, the IC 232 may include the control circuit 212, the transmission processing circuit 213, and the reception processing circuit 214, and the IC 231 may include the DA conversion circuits 215 and 216, and the AD conversion circuits 217 and 218.

The control circuit 212 corresponds, as one example, to a communication controlling device for controlling communication, or a control unit for controlling communication. At this point, the wireless communication unit may include the transmission processing circuit 213 and the reception processing circuit 214. The wireless communication unit may further include the DA conversion circuits 215 and 216, and the AD conversion circuits 217 and 218, in addition to the transmission processing circuit 213 and the reception processing circuit 214. The wireless communication unit may even further include a transmission circuit 222 and a reception circuit 223, in addition to the transmission processing circuit 213, the reception processing circuit 214, the DA conversion circuits 215 and 216, and the AD conversion circuits 217 and 218. The integrated circuit according to the present embodiment may include a processor that performs all or a part of the processing in the baseband unit 211, that is, all or a part of the processing in the control circuit 212, the transmission processing circuit 213, the reception processing circuit 214, the DAs 215 and 216, and the ADs 217 and 218.

Alternatively, the IC 232 may correspond to the communication controlling device for controlling communication. At this point, the wireless communication unit may include the transmission circuit 222 and the reception circuit 223. The wireless communication unit may further include, in addition to the transmission circuit 222 and the reception circuit 223, the DA conversion circuits 215 and 216, and the AD conversion circuits 217 and 218.

The control circuit 212 in the baseband unit 211 includes the buffer 204 of FIG. 10, and performs processes in the MAC layer and the like. The control circuit 212 may include the clock generation unit. The transmission processing circuit 213 performs a desired process in the physical layer such as a modulation process or an addition of a physical header, and creates, for example, two kinds of digital baseband signals (hereafter, referred to as a digital I signal and a digital Q signal). In the case of the MIMO transmission, the two kind of digital baseband signals are created for each stream. The DA converting circuits 215 and 216 subject signals input from the transmission processing circuit 213 to the DA conversion. More specifically, the DA converting circuit 215 converts the digital signal into an analog I signal, the DA converting circuit 216 converts the digital Q signal into an analog Q signal. Note that the analog signals may be transmitted with a single-channel signal without the quadrature modulation. In this case, the number of DA converting circuits may be one. In addition, in the case where one or more channels of transmission signals are transmitted being distributed to a plurality of antennas, DA converting circuits corresponding in number to the antennas may be provided.

The RF unit 221 is, as one example, an RF analog IC or an RF IC. The transmission circuit 222 in the RF unit 221 includes a transmission filter for extracting a signal in a desired band from the signal of the DA-converted frame, a mixer for upconverting the filtered signal into that of a radio frequency by making use of a signal of a certain frequency supplied from an oscillator, a preamplifier (PA) for amplifying the upconverted signal, and the like.

The reception circuit 223 includes an LNA (Low Noise Amplifier) for amplifying the signal received by the antenna, a mixer for downconverting the amplified signal into that of a baseband by making use of a signal of a certain frequency supplied from an oscillator, a reception filter for extracting a signal in a desired band from the downconverted signal, and the like. More specifically, the reception circuit 223 subjects the received signals that is subjected to low-noise amplification by a low noise amplifier (not shown) to quadrature demodulation with carriers the phase difference between which is 90° to create the I (In-phase) signal being in phase with the received signal and the Q (Quad-phase) signal with a phase delayed by 90° from the I signal. These I signal and Q signal are adjusted in gain and output from the reception circuit 223.

The AD conversion circuits 217 and 218 in the baseband unit 211 perform AD conversion to the input signal from the reception circuit 223. Although two systems of AD conversion circuit here, which perform parallel processing, are provided here, the number of the AD conversion circuits may be one. More specifically, the AD converting circuit 117 converts an I signal into a digital I signal, and the AD converting circuit 118 converts the Q signal into a digital Q signal. Note that the analog signals may be received with a single-channel signal without the quadrature modulation. In this case, the number of the AD converting circuits may be one. In addition, in the case where a plurality of antennas are provided, AD converting circuits corresponding in number to the antennas may be provided. The reception processing circuit 214 performs a process in the physical layer, a demodulation process, and the like. The control circuit 212 performs processes in the MAC layer and the like to the demodulated frame.

Alternatively, in the case where the wireless terminal includes a plurality of antennas to support MIMO, the control circuit 212 also performs a process relating to MIMO. For example, a process of channel estimation, a transmission weight calculation process, a separate process of streams, and the like are performed.

Note that a switch for switching the antenna 1A to any one of the transmission circuit 222 and the reception circuit 223 may be disposed in the RF unit 221. By the switching control, the antenna 1A is connected to the transmission circuit 222 when transmitting, and the antenna 1A is connected to the reception circuit 223 when receiving.

The detailed description of the process of the above-described components is obvious from the description of FIG. 10, and therefore redundant descriptions will be omitted.

Eighth Embodiment

Figure 19:
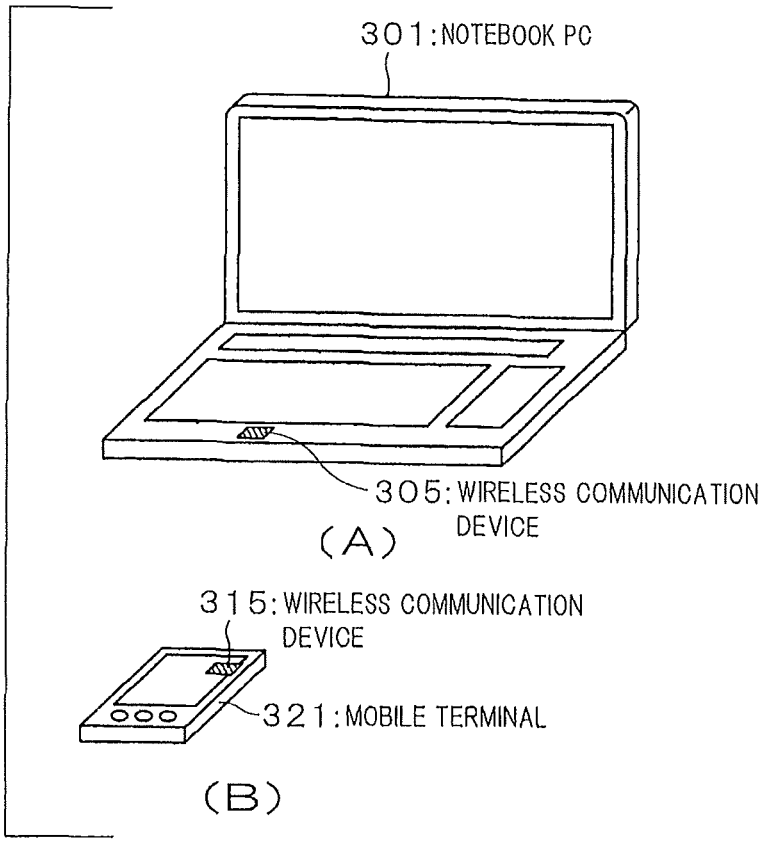
FIG. 19 is a perspective view of a wireless terminal according to an eighth embodiment.

FIG. 19(A) and FIG. 19(B) are perspective views of wireless terminal according to the eighth embodiment. The wireless terminal in FIG. 19(A) is a notebook PC 301 and the wireless communication device in FIG. 19(B) is a mobile terminal 321. Each of them corresponds to one mode of a wireless terminal or an access point. The notebook PC 301 and the mobile terminal 321 are equipped with wireless communication devices 305 and 315 respectively. For the wireless communication devices 305 and 315, it is possible to use the wireless communication device provided in a wireless terminal or an access point which have been described above. The wireless terminal equipped with the wireless communication device is not limited to the notebook PC and the mobile terminal. For example, it can be provided in a TV, a digital camera, a wearable device, a tablet, a smart phone, a gaming device, a network storage device, a monitor, a digital audio player, a web camera, a video camera, a projector, a navigation system, an external adapter, an internal adapter, a set top box, a gateway, a printer server, a mobile access point, a router, an enterprise/service provider access point, a portable device, a handheld device and so on.

Figure 20:
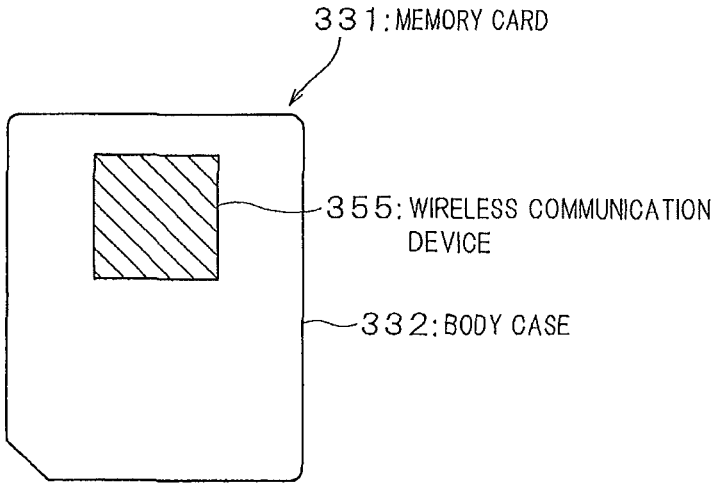
FIG. 20 is a diagram showing a memory card according to the eighth embodiment.

Moreover, a wireless communication device installed in a terminal or an access point can also be installed in a memory card. FIG. 20 illustrates an example of mounting the wireless communication device on the memory card. A memory card 331 includes a wireless communication device 355 and a body case 332. The memory card 331 uses the wireless communication device 355 for wireless communication with an external device (a wireless terminal or an access point, etc.). Here, in FIG. 20, the description of other elements (for example, a memory, and so on) in the memory card 331 is omitted.

Ninth Embodiment

In the ninth embodiment, a bus, a processor unit and an external interface unit are provided in addition to the configuration of the wireless communication device according to any of the first to seventh embodiments. The processor unit and the external interface unit are connected with a buffer through the bus. Firmware operates in the processor unit. Thus, by adopting a configuration in which the firmware is included in the wireless communication device, it becomes possible to easily change the function of the wireless communication device by rewriting the firmware. The processing unit in which the firmware operates may be a processor that performs the process of the communication controlling device or the control unit according to the present embodiment, or may be another processor that performs a process relating to extending or altering the functions of the process of the communication controlling device or the control unit. The processing unit in which the firmware operates may be included in the access point or the wireless terminal according to the present embodiment. Alternatively, the processing unit may be included in the integrated circuit of the wireless communication device installed in the access point, or in the integrated circuit of the wireless communication device installed in the wireless terminal.

Tenth Embodiment

In the tenth embodiment, a clock generating unit is provided in addition to the configuration of the wireless communication device according to any of the first to eighth embodiments. The clock generating unit generates a clock and outputs the clock from an output terminal to the external of the wireless communication device. Thus, by outputting the clock generated in the wireless communication device to the external and operating the host side by means of the clock output to the external, it becomes possible to operate the host side and the wireless communication device side in a synchronized manner.

Eleventh Embodiment

In the eleventh embodiment, a power source unit, a power source controlling unit and a wireless power feeding unit are included in addition to the configuration of the wireless communication device according to any of the first to eighth embodiments. The power supply controlling unit is connected with the power source unit and the wireless power feeding unit, and performs control to select a power source supplied to the wireless communication device. Thus, by adopting a configuration in which the power source is included in the wireless communication device, power consumption reduction operations that control the power source become possible.

Twelfth Embodiment

In the twelfth embodiment, a SIM card is included in addition to the configuration of the wireless communication device according to the eleventh embodiment. For example, the SIM card is connected with the MAC processing unit 10, the MAC/PHY management unit 60 or the controlling unit 112 in the wireless communication device. Thus, by adopting a configuration in which the SW card is included in the wireless communication device, it becomes possible to easily perform authentication processing.

Thirteenth Embodiment

In the thirteenth embodiment, a video image compressing/decompressing unit is included in addition to the configuration of the wireless communication device according to the ninth embodiment. The video image compressing/decompressing unit is connected with a bus. Thus, by adopting a configuration in which the video image compressing/decompressing unit is included in the wireless communication device, it becomes possible to easily transmit a compressed video image and decompress a compressed video image received.

Fourteenth Embodiment

In the fourteenth embodiment, an LED unit is included in addition to the configuration of the wireless communication device according to any of the first to eighth embodiments. For example, the LED unit is connected with at least one of the MAC processing unit 10, the MAC/PHY management unit 60, the transmission processing circuit 113, the reception processing circuit 114 and the controlling circuit 112. Thus, by adopting a configuration in which the LED unit is included in the wireless communication device, it becomes possible to easily notify the operation state of the wireless communication device to the user.

Fifteenth Embodiment

In the fifteenth embodiment, a vibrator unit is included in addition to the configuration of the wireless communication device according to any of the first to eighth embodiments. For example, the vibrator unit is connected with at least one of the MAC processing unit 10, the MAC/PHY management unit 60, the transmission processing circuit 113, the reception processing circuit 114 and the controlling circuit 112. Thus, by adopting a configuration in which the vibrator unit is included in the wireless communication device, it becomes possible to easily notify the operation state of the wireless communication device to the user.

Sixteenth Embodiment

In a sixteenth embodiment, the configuration of the wireless communication device includes a display in addition to the configuration of the wireless communication device (wireless communication device of the access point or the wireless communication device of the wireless terminal) according to any one of the first to eighth embodiments. The display may be connected to the control unit (101 or 201) of the wireless communication device via a bus (not shown). As seen from the above, the configuration including the display to display the operation state of the wireless communication device on the display allows the operation status of the wireless communication device to, be easily notified to a user.

Seventeenth Embodiment

In the present embodiment, [1] the frame type in the wireless communication system, [2] a procedure of disconnecting wireless communication devices, [3] an access scheme of a wireless LAN system and [4] an interframe space of a wireless LAN are described.

[1] Frame Type in Communication System

Generally, as mentioned above, frames handled on a wireless access protocol in a wireless communication system are roughly divided into the three types of the data frame, the management frame and the control frame. These types are normally shown in a header part which is commonly provided to frames. As a display method of the frame type, the three types may be distinguished in one field or may be distinguished by a combination of two fields.

The management frame is a frame used to manage a physical communication link with another wireless communication device. For example, there are frames used to perform communication settings with the other wireless communication device or a frame to release communication links (that is, to disconnect the connection), and a frame related to power saving operations in the wireless communication device.

The data frame is a frame to transmit data generated in the wireless communication device to the other wireless communication device after a physical communication link with the other wireless communication device is established. The data is generated in a higher layer of the present embodiment and generated by, for example, a user's operation.

The control frame is a frame used to perform control at the time of transmission and reception (exchange) of the data frame with the other wireless communication device. A response frame, transmitted as acknowledgment in a case where the wireless communication device receives the data frame or the management frame, belongs to the control frame.

These three types of frames are subjected to processing as necessary in the physical layer and then transmitted as physical packets via an antenna. Here, in a procedure of establishing connection, a connection request frame and a connection reception frame are management frames, and it is possible to use the response frame of the control frame as a confirmation frame with respect to the connection reception frame.

[2] Procedure of Disconnecting Wireless Communication Devices

For disconnecting follows an explicit procedure and an implicit procedure. According to the explicit procedure, a frame to disconnect any one of the connected wireless communication devices is transmitted. This frame is classified as a management frame. The frame for disconnecting may be, for example, referred to as "a release frame" meaning it releases connection. Normally, it is determined that the connection is disconnected at the time of transmitting the release frame in a wireless communication device on the transmission side and at the time of receiving the release frame in a wireless communication device on the reception side. Afterward, it returns to the initial state in a communication phase, for example, a state of searching a wireless communication device of the communicating partner. This is because, at the time of transmitting the frame for disconnecting, a physical wireless link may not be secured due to, for example, the communication distance to the wireless communication device target of connection is considerable and radio signals cannot be received or decoded.

On the other hand, according to the implicit procedure, it is determined that the connection state is disconnected in a case where frame transmission (transmission of a data frame and management frame or transmission of a response frame with respect to a frame transmitted by the subject device) is not detected from a wireless communication device of the connection partner which has established the connection for a certain period. Such a procedure is provided because, in a state where it is determined that the connection is disconnected as mentioned above, a state is considered where the physical wireless link cannot be secured due to, for example, the communication distance to the wireless communication device target of connection is considerable and radio signals cannot be received or decoded. That is, it is because the reception of the release frame cannot be expected.

As a specific example of determining the disconnection of connection in an implicit manner, a timer is used. For example, at the time of transmitting a data frame that requests an acknowledgment response frame, a first timer (for example, a retransmission timer for a data frame) that limits the retransmission period of the frame is activated, and, if the acknowledgement response frame to the data frame is not received before the expiration of the first timer (that is, before a desired retransmission period passes), retransmission is performed. When the acknowledgment response frame to the frame is received, the first timer is stopped.

On the other hand, when the acknowledgment response frame is not received and the first timer expires, for example, a management frame to confirm whether a wireless communication device of a connection partner is still present (in a communication range) (in other words, whether a wireless link is secured) is transmitted, and, at the same time, a second timer (for example, a retransmission timer for the management frame) to limit the retransmission period of the frame is activated. Similarly to the first timer, even in the second timer, retransmission is performed if an acknowledgment response frame to the frame is not received until the second timer expires, and it is determined that the connection is disconnected when the second timer expires.

Alternatively, a third timer is activated when a frame is received from a wireless communication device of the connection partner, it is stopped every time the frame is newly received from the wireless communication device of the connection partner, and it is reactivated from the initial value. When the third timer expires, similarly to the above, a management frame to confirm whether the wireless communication device of the connection party is still present (in a communication range) (in other words, whether a wireless link is secured) is transmitted, and, at the same time, a second timer (for example, a retransmission timer for the management frame) to limit the retransmission period of the frame is activated. Even in this case, retransmission is performed if an acknowledgment response frame to the frame is not received before the second timer expires, and it is determined that the connection is disconnected when the second timer expires. The latter management frame to confirm whether the wireless communication device of the connection partner is still present may differ from the management frame in the former case. Moreover, regarding the timer to limit the retransmission of the management frame in the latter case, although it is identical to that used in the former case as second timer, a different timer may be also used.

[3] Access Scheme of Wireless LAN System

For example, there is a wireless LAN system which is assumed to communicate or compete with a plurality of wireless communication devices. CSMA/CA is set as the basis of an access scheme in the IEEE802.11 (including an expansion standard or the like) wireless LAN. In a scheme in which transmission by a certain wireless communication device is detected and transmission is performed after a fixed time from the transmission end, simultaneous transmission is performed in the plurality of wireless communication devices that detect the transmission by the wireless communication device, and, as a result, radio signals collide and frame transmission fails. By detecting the transmission by the certain wireless communication device and waiting for a random time from the transmission end, transmission by the plurality of wireless communication devices that detect the transmission by the wireless communication device is stochastically distributed. Therefore, if the number of wireless communication devices assigned the earliest time out of a random of times is one, frame transmission by the wireless communication device succeeds and frame collision can be prevented. Since the acquisition of the transmission right based on the random value becomes impartial between the plurality of wireless communication devices, it can be said that a scheme adopting Carrier Avoidance is a suitable scheme to share a wireless medium between the plurality of wireless communication devices.

[4] Interframe Space of Wireless LAN

The interframe space of the IEEE802.11 wireless LAN is described. There are six types of interframe spaces used in the IEEE802.11 wireless LAN, such as distributed coordination function interframe space (DIFS), arbitration interframe space (AIFS), point coordination function interframe space (PIFS), short interframe space (SIFS), extended interframe space (EIFS) and reduced interframe space (RIFS).

The definition of the interframe space is defined as a continuous period that should confirm and open the idle carrier sense before transmission in the IEEE802.11 wireless LAN, and a strict period from a previous frame is not discussed. Therefore, the above defined definition is adhered to through the explanation of the IEEE802.11 wireless LAN system. In the IEEE802.11 wireless LAN, a waiting time at the time of random access based on CSMA/CA is assumed to be the sum of a fixed time and a random time, and it can be said that such a definition intends to clarify the fixed time.

DIFS and AIFS are interframe spaces used when attempting the frame exchange start in a contention period that competes with other wireless communication devices based on CSMA/CA. DIFS is used in a case where the right of priority according to the traffic type is not distinguished, AIFS is used in a case where the right of priority by traffic identifier (TID) is provided.

Since DIFS and AIFS are used in similar operation, AIFS is chiefly used to give the explanation below. In the IEEE802.11 wireless LAN, access control including the start of frame exchange in the MAC layer is performed. In addition, in a case where QoS (Quality of Service) is supported when data is transferred from a higher layer, the traffic type is notified together with the data, and the data is classified by priority at the time of access on the basis of the traffic type. The class at the time of this access is referred to as "access category (AC)". Therefore, the value of AIFS is provided in every access category.

PIFS is an interframe space to enable an access more preferential than that of other competing wireless communication devices, and the period is shorter than the values of DIFS and AIFS. SIFS is an interframe space which can be used in a case where frame exchange continues in a burst manner at the time of transmission of a control frame of a response system or once the access right is acquired. EIFS is an interframe space caused when frame reception fails.

RIFS is an interframe space which can be used in a case where a plurality of frames are continuously transmitted to the same wireless communication device in a burst manner once the access right is acquired, and a response frame from a wireless communication device of the transmission partner is not requested while RIFS is used.

Figure 21:
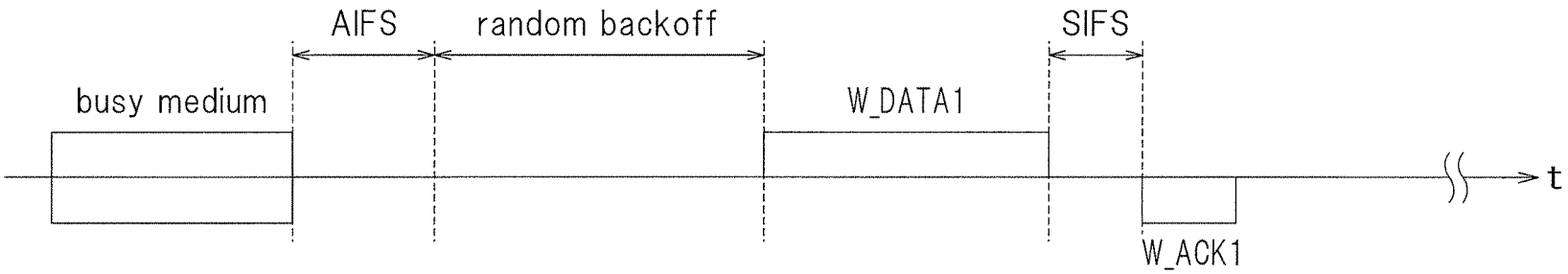
FIG. 21 is a diagram showing one example of frame exchanging during a contention period.

Here, FIG. 21 illustrates one example of frame exchange in a competitive period based on the random access in the IEEE802.11 wireless LAN.

When a transmission request of a data frame (W_DATA1) is generated in a certain wireless communication device, it is assumed that it is recognized that a medium is busy (busy medium) as a result of carrier sense. In this case, AIFS of a fixed time is set from the time point at which the carrier sense becomes idle, and, when a random time (random backoff) is set afterward, data frame W_DATA1 is transmitted to the communicating partner.

The random time is acquired by multiplying a slot time by a pseudorandom integer derived from the uniform distribution between contention windows (CW) given by integers from 0. Here, what multiplies CW by the slot time is referred to as "CW time width". The initial value of CW is given by CWmin, and the value of CW is increased up to CWmax every retransmission. Similarly to AIFS, both CWmin and CWmax have values for every access category. In a wireless communication device of transmission destination of W_DATA1, when reception of the data frame succeeds, a response frame (W_ACK1) is transmitted after SIFS from the reception end time point. If W_ACK1 is received within a transmission burst time limit, the wireless communication device that transmits W_DATA1 can transmit the next frame (for example, W_DATA2) after SIFS.

Although AIFS, DIFS, PIFS and EIFS are functions between SIFS and the slot-time, SIFS and the slot time are defined for every physical layer. Moreover, although parameters to which the value of each access category such as AIGS, CWmin and CWmax is set can be set every communication group (which is a basic service set (BSS) in the IEEE802.11 wireless LAN), the default values are defined.

For example, in the definition of 802.11ac, with an assumption that SIFS is 16 μs and the slot time is 9 μs, and thereby PIFS is 25 μs and DIFS is 34 μs, the default value of the interframe space of an access category of BACKGROUND (AC_BK) in AIFS is 79 μs, the default value of the interframe space of BEST EFFORT (AC_BE) is 43 μs, the default value of the interframe space between VIDEO (AC_VI) and VOICE(AC_VO) is 34 μs, and the default values of CWmin and CWmax are 31 and 1023 in AC_BK and AC_BE, 15 and 31 in AC_VI and 7 and 15 in AC_VO. Here, EIFS denotes the sum of the time lengths of response frames in a case where SIFS and DIFS are transmitted at the lowest obligatory physical rate. In the present embodiment, a wireless communication system using parameters at such interframe spaces is assumed to be an interfering system with a wide communication range.

The terms used in each embodiment should be interpreted broadly. For example, the term "processor" may encompass a general purpose processor, a central processing unit (CPU), a microprocessor, a digital signal processor (DSP), a controller, a microcontroller, a state machine, and so on. According to circumstances, a "processor" may refer to an application specific integrated circuit (ASIC), a field programmable gate array (FPGA), and a programmable logic device (PLD), etc. The term "processor" may refer to a combination of processing devices such as a plurality of microprocessors, a combination of a DSP and a microprocessor, one or more microprocessors in conjunction with a DSP core.

As another example, the term "memory" may encompass any electronic component which can store electronic information. The "memory" may refer to various types of media such as random access memory (RAM), read-only memory (ROM), programmable read-only memory (PROM), erasable programmable read only memory (EPROM), electrically erasable PROM (EEPROM), non-volatile random access memory (NVRAM), flash memory, magnetic or optical data storage, which are readable by a processor. It can be said that the memory electronically communicates with a processor if the processor read and/or write information for the memory. The memory may be integrated to a processor and also in this case, it can be said that the memory electronically communication with the processor.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A wireless communication device, comprising:

a transmitter configured to transmit a first frame containing notification information to specify a first wireless terminal and a second wireless terminal and a second frame for channel estimation; and a receiver configured to receive a third frame transmitted from the first wireless terminal in response to the first frame and a fourth frame transmitted from the second wireless terminal; in response to the first frame, wherein the third frame and the fourth frame are transmitted in a multiplexing scheme by the first wireless terminal and the second wireless terminal, wherein the third frame contains first channel information estimated based on the second frame, wherein the fourth frame contains second channel information estimated based on the second frame, and wherein the first frame contains first information to specify a preamble of the third frame and a preamble of the fourth frame, the preamble of the third frame and the preamble of the fourth frame include mutually-orthogonal bit patterns for channel estimation, and the receiver receives the third frame and the fourth frame whose preambles include the bit patterns specified by the first information from the first terminal and the second terminal in same frequency band, or the first frame contains second information to specify a first subcarrier used for transmission of a preamble of the third frame and a second subcarrier orthogonal to the first subcarrier, used for transmission of a preamble of the fourth frame, the receiver receives the preambles of the third frame and the fourth frame transmitted via the first subcarrier and the second subcarrier specified by the second information from the first wireless terminal and the second wireless terminal, the preambles include any bit patterns for channel estimation, and receives parts following the preambles of the third frame and the fourth frame in same frequency band.

2. The device according to claim 1, wherein the receiver obtains third channel information and fourth channel information by estimating channels based on the bit pattern of the preamble of the third frame and the bit pattern of the preamble of the fourth frame received, and demodulates parts following the preambles of the third frame and the fourth frame based on the third channel information and the fourth channel information.

3. The device according to claim 1, wherein the bit patterns of the preambles of the third frame and the fourth frame which are mutually orthogonal corresponds to different ones of rows or columns in an orthogonal matrix based on a total number of streams used by the first wireless terminal and the second wireless terminal.

4. The device according to claim 3, wherein the notification information contains information on the total number of streams used by the first wireless terminal and the second wireless terminal.

5. The device according to claim 1, wherein the notification information contains information on a number of streams allowed for the first wireless terminal and information on a number of streams allowed for the second wireless terminal.

6. The device according to claim 1, wherein the notification information contains information on an amount of correction for a frequency used in transmission of the third frame and an amount of correction for a frequency used in transmission of the fourth frame.

7. The device according to claim 1, wherein the notification information contains information on a transmission power value of the first frame and information on an expected received power value of the third frame and an expected received power value of the fourth frame.

8. The device according to claim 1, wherein the transmitter is configured to transmit the second frame after the first frame is transmitted.

9. The device according to claim 1, further comprising: at least one antenna.

10. A wireless communication device, comprising:

a receiver configured to receive a first frame containing notification information to specify the wireless communication device and a second wireless terminal and a second frame for channel estimation, from a third terminal; and a transmitter configured to transmit a third frame in response to the first frame to the third wireless terminal, which contains first channel information based on the second frame, wherein the third frame is multiplexed with a fourth frame transmitted in response to the first frame from the second wireless terminal, and wherein the first frame contains first information to specify a bit pattern of a preamble of the third frame and a bit pattern of a preamble of the fourth frame, the transmitter transmits the third frame having the preamble having the bit pattern specified by the first information, the bit pattern of the preamble of the third frame is orthogonal to the bit pattern of the preamble of the fourth frame transmitted from the second wireless terminal, and the third frame and the fourth frame are transmitted in same frequency band, or the first frame contains second information to specify a first subcarrier used for transmission of a preamble of the third frame and a second subcarrier orthogonal to the first subcarrier, used for transmission of a preamble of the fourth frame, the transmitter transmits the preamble of the third frame via the first subcarrier specified by the second information, the third frame having a bit pattern for channel estimation, and a part following the preamble of the third frame is transmitted in same frequency band as that of a part following the preamble of the fourth frame.

11. The device according to claim 10, wherein the notification information contains information on a transmission power value of the first frame, an expected received power value of the third frame, and the transmitter is configured to transmit the third frame at transmission power determined such that received power of the third frame in the third wireless terminal is coincident with the expected received power value.

12. The device according to claim 10, wherein the bit patterns of the preambles of the third frame and the fourth frame which are specified by the first information correspond to different ones among rows or columns in an orthogonal matrix based on a total number of streams used by the wireless device and the second wireless terminal.

13. The device according to claim 10, wherein the notification information contains on an amount of correction for a frequency used in transmission of the third frame, and the transmitter is configured to transmit the third frame on a basis of the amount of correction.

14. The device according to claim 10, further comprising: at least one antenna.

15. A wireless communication method, comprising:

transmitting a first frame containing notification information to specify a first wireless terminal and a second wireless terminal and a second frame for channel estimation; and receiving a third frame transmitted from the first wireless terminal in response to the first frame and a fourth frame transmitted from the second wireless terminal in response to the first frame, wherein the third frame and the fourth frame are transmitted in a multiplexing scheme by the first wireless terminal and the second wireless terminal, wherein the third frame contains first channel information estimated based on the second frame, wherein the fourth frame contains second channel information estimated based on the second frame, and wherein the first frame contains first information to specify a preamble of the third frame and a preamble of the fourth frame, the preamble of the third frame and the preamble of the fourth frame include mutually-orthogonal bit patterns for channel estimation, the method comprises receiving the third frame and the fourth frame whose preambles include the bit patterns specified by the first information from the first terminal and the second terminal in same frequency band, or the first frame contains second information to specify a first subcarrier used for transmission of a preamble of the third frame and a second subcarrier orthogonal to the first subcarrier, used for transmission of a preamble of the fourth frame, the method comprises receiving the preambles of the third frame and the fourth frame via the first subcarrier and the second subcarrier specified by the second information from the first wireless terminal and the second wireless terminal, and receiving parts following the preambles of the third frame and the fourth frame in same frequency band.

16. The method according to claim 15, further comprising obtaining third channel information and fourth channel information by estimating channels based on the bit pattern of the preamble of the third frame and the bit pattern of the preamble of the fourth frame received, and demodulates parts following the preambles of the third frame and the fourth frame based on the third channel information and the fourth channel information.

17. The method according to claim 15, wherein the bit patterns of the preambles of the third frame and the fourth frame which are mutually orthogonal corresponds to different ones among rows or columns in an orthogonal matrix based on a total number of streams used by the first wireless terminal and the second wireless terminal.

18. The method e according to claim 15, wherein the notification information contains information on a transmission power value of the first frame, an expected received power value of the third frame and an expected received power value of the fourth frame.

19. The method according to claim 15, wherein the second frame is transmitted after the first frame is transmitted.

*20. The device according to claim 10 wherein*

*the receiver is configured to receive the first frame and the second frame in compliance with IEEE 802.11 standards, and*

*the transmitter is configured to transmit the third frame in compliance with IEEE 802.11 standards.*

* * * * *